United States Patent
Rosario

(10) Patent No.: US 7,593,587 B1
(45) Date of Patent: Sep. 22, 2009

(54) SPECTRAL FEATURE GENERATION USING HIGH-PASS FILTERING FOR SCENE ANOMALY DETECTION

(75) Inventor: Dalton S. Rosario, Germantown, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 571 days.

(21) Appl. No.: 11/171,366

(22) Filed: Jul. 1, 2005

Related U.S. Application Data

(60) Provisional application No. 60/670,263, filed on Apr. 12, 2005.

(51) Int. Cl.
*G06K 9/40* (2006.01)
*H04N 13/00* (2006.01)

(52) U.S. Cl. ............... 382/263; 348/208.4; 382/274

(58) Field of Classification Search ............ 382/274, 382/263; 348/208.4
See application file for complete search history.

(56) References Cited

U.S. PATENT DOCUMENTS

| | | | | |
|---|---|---|---|---|
| 5,892,602 A * | 4/1999 | Sirat | ................ | 359/30 |
| 6,052,489 A * | 4/2000 | Sakaue | ................ | 382/266 |
| 6,347,762 B1 * | 2/2002 | Sims et al. | ........... | 244/3.17 |
| 6,476,824 B1 * | 11/2002 | Suzuki et al. | ........... | 345/690 |
| 6,608,931 B2 * | 8/2003 | Sunshine et al. | ........... | 382/191 |
| 7,263,226 B1 * | 8/2007 | Stein et al. | ........... | 382/190 |
| 2002/0012451 A1 * | 1/2002 | Lin | ............ | 382/103 |
| 2003/0198364 A1 * | 10/2003 | Yonover et al. | ........... | 382/103 |
| 2005/0270528 A1 * | 12/2005 | Geshwind et al. | ........ | 356/330 |
| 2007/0076955 A1 * | 4/2007 | Schaum et al. | ........... | 382/191 |

OTHER PUBLICATIONS

Liu et al. "A Nested Spatial Window-Based Approach to Target Detection for Hyperspectral Imagery" Sep. 2004, Geoscience and Remote Sensing Symposium, 2004. IGARSS '04. Proceedings. 2004 IEEE International, pp. 266-268.*
Kwon et al. "Adaptive Anomaly Detection Using Subspace Separation for Hyperspectral Imagery" SPIE, vol. 42, No. 11 Nov. 2003 pp. 3342-3351.*
Q. Du and Hsuan Ren, "Real-time constrained linear discriminant analysis to target detection and classification in hyperspectral imagery," Pattern Recognition, 36, pp. 1-12 (2003).
A. Margalit et al., "Adaptive Optical Target Detection Using Correlated Images," IEEE Transactions on Aerospace and Electronic Systems, vol. AES-21(3), May 1985, pp. 394-405.

(Continued)

*Primary Examiner*—Samir A. Ahmed
*Assistant Examiner*—Stephen R Koziol
(74) *Attorney, Agent, or Firm*—William V. Adams; Guy M. Miller

(57) ABSTRACT

A method of detecting an image anomaly (target) within a scene represented by image data comprises obtaining test data from a test window within the scene, combining the test data with reference data to generate combined data, then comparing the combined data with either the test data or the reference data. An improved image analyzer includes a computational unit configured to execute this method. In one example, image data is generated by a hyperspectral imager.

2 Claims, 8 Drawing Sheets

OTHER PUBLICATIONS

Stein et al., "Anomaly detection from hyperspectral imagery," IEEE Signal Processing Magazine, Jan. 2002, pp. 58-69.

D.S. Rosario, Highly effective logistic regression model for signal (anomaly) detection, IEEE International Conference on Acoustics, Speech, and Signal Processing (ICASSP '04, May 17-21, 2004), Proceedings, vol. 5, pp. 817-820 (2004).

S. M. Schweizer and J.M.F. Moura, "Hyperspectral Imagery: Clutter Adaptation in Anomaly Detection," IEEE Transactions on Information Theory, vol. 46(5), Aug. 2000, pp. 1855-1871.

D. Manolakis and G. Shaw, "Detection Algorithms for Hyperspectral Imaging Applications," IEEE Signal Processing Magazine, Jan. 2002, pp. 29-43.

* cited by examiner

SPECTRAL FEATURE GENERATION USING HIGH-PASS FILTERING FOR SCENE ANOMALY DETECTION

REFERENCE TO RELATED APPLICATION

This application claims priority to U.S. Provisional Patent Application Ser. No. 60/670,263, filed on 12 Apr. 2005, the entire content of which is incorporated herein by reference.

GOVERNMENT INTEREST

The invention described herein may be manufactured, used, and licensed by or for the United States Government.

FIELD OF THE INVENTION

The present invention relates to data analysis, in particular to the detection of image anomalies using hyperspectral sensor imagery.

BACKGROUND OF THE INVENTION

In the context of primitive computer vision, it would be desired to have a relatively simple automatic approach capable of focusing its attention in the same way a human analyst would observing the same set of images. For reasons well known and highlighted in standard computer-vision books (see, for instance, Lagarias, J. C., J. A. Reeds, M. H. Wright, and P. E. Wright, "Convergence Properties of the Nelder-Mead Simplex Method in Low Dimensions," SIAM Journal of Optimization, Vol. 9 Number 1, pp. 112-147, 1998), that expectation, however, is rarely met with experimental results, despite of the fact that sometimes the scenes in reference are characterized by image analysts as easy to focus their attentions to certain types of objects in the scenes.

Humans, of course, use a combination of knowledge-based, local and global information to aid in the analysis of a scene, a capability that may be reproduced by applying, for instance, layers of unsupervised learning methods complementing each other to perform this single task. For example, a suite of algorithms that includes an edge detector, an edge elongation, a clustering method, and a morphological size test might reproduce the humans' performance in certain conditions, albeit with a huge cost: computational time. Needless to say, the topic of automatic focus of attention (FOA) is an open and quite active area of research.

An advantage of choosing hyperspectral data over broadband is that a particular type of material, for instance, may be identified by testing a few pixels of the tested object, independently of the object's orientation, elevation angle, and distance from the sensor. Hyperspectral sensors are passive sensors that simultaneously record images for many contiguous and narrowly spaced regions of the electromagnetic spectrum. A data cube is created from these images, in which each image corresponds to the same ground scene and contains both spatial and spectral information about objects and backgrounds in the scene. These sensors employ several bands and have been used in various fields including urban planning, mapping, and military surveillance.

A further advantage of choosing anomaly detection over a particular type of material detection is that oftentimes the exact material of interest is not known a priori, or the number of spectra in a material of interest library is simply too exhaustive to search for all possible materials. The goal of an anomaly detector is to identify statistical outliers, i.e., data points that are atypical compared to the rest of the data. An anomaly detector that properly detects all, or a significant portion, of the pixels representing meaningful objects (targets) while at the same time having hundreds of meaningless detections (false alarms) has little practical value.

Most conventional anomaly detectors use multivariate models to define the spectral variability of the data, and the majority of the data pixels are assumed to be spectrally homogeneous and are modeled using a multivariate probability density function with a single set of parameters. Until now, no significant work had been done to find non-normal statistical models for the development of anomaly detection techniques using hyperspectral data. Conventional anomaly detectors may detect the presence of targets using hyperspectral data, but in the process they yield a large number of false alarms. This type of performance has little practical value.

SUMMARY OF THE INVENTION

A method of detecting an image anomaly within a scene represented by image data, the method comprises defining a test window within the scene, obtaining test data relating to the test window, obtaining reference data, generating combined data by combining the test data and the reference data, and detecting the image anomaly by comparing the combined data with the test data or with the reference data. The reference data can be obtained from a reference window, which may surround the test window, and may be spaced apart from the test window by a guard region from which no data is obtained. The reference data can also be obtained from one or more fixed locations within the scene, and/or include representative data obtained from another scene, such as data from natural features from within the scene.

Test data can be derived from a test spectrum obtained from the test window, which may be an average spectrum obtained from a number of image pixels. Reference data can be derived from a reference spectra obtained either from a reference window, other locations within the scene, or reference spectra obtained from other scenes. Variability spectra can also be obtained, for example from a variability window surrounding the test window, and used in generating the test data and the reference data. Variability spectra can also be obtained from different portions of the reference window, with the reference spectrum being an average spectrum from the reference window.

In examples of the present invention, the test data comprise a test feature set derived from the test spectrum and the variability spectra, the reference data comprise a reference feature set derived from the reference spectrum and the variability spectra, and the combined data is a combined feature set, the combined feature set being a combination of the test feature set and the reference feature set. The contents of the test feature set can be generated by applying a high-pass filter to the test spectrum to obtain a filtered test spectrum, applying a high-pass filter to the reference spectrum to obtain a filtered reference spectrum, and applying a high pass filter to each of the variability spectra to obtain filtered variability spectra, and generating the test feature set, each component of the test feature set being generated from the filtered test spectrum and one of the filtered variability spectra, the test feature set having a number of components equal to the number of variability spectra, the reference feature set being generated in a similar manner.

Novel algorithms were developed, giving a numerical output corresponding to a strength of anomaly, a strong anomaly being present if the test data represents object characteristics that do not contribute to the reference data, a weak anomaly being present if the test data represents object characteristics that in part contribute to the reference data, and no anomaly being present if the test data represents object characteristics that substantially contribute to the reference data. In representative examples, the algorithm can be a semiparametric algorithm responsive to the estimator of a parameter that determines the likelihood of two distributions being the same, and also responsive to the variance of the combined feature set, or responsive to any combination of lower or higher moments (including the means), and/or to any combination of lower or higher central moments (including the variances), computed from the test feature set or reference feature set, as a mathematical expression responsive also to these corresponding moments and central moments computed from the combined feature set in order to compare the test and reference feature sets.

An improved image anomaly detector for detecting an anomaly within a scene comprises a source of image data, such as hyperspectral image data, relating to the scene, and a computation unit, the computation unit detecting an anomaly within the scene using an indirect comparison method. The source of image data can be a hyperspectral image database, a hyperspectral imaging device, or other imaging device. The computation unit may output a visual representation of the comparison of the combined data with the test data or the reference data, for example as a visual representation of numerical data. The apparatus may comprise a computational unit operational to define a test window as a portion of the scene, obtain test data from the test window, obtain reference data, and detect the image anomaly by performing an indirect comparison of the test data and the reference data by comparing a combination of the test data and the reference data with either the test data or the reference data. The data source may be a hyperspectral image sensor, for example mounted on a mobile unit.

In an indirect comparison approach, samples are not compared as individual entities, but as individual entities and the union among these entities. Let X and Y denote two random samples, and let Z=X U Y, where U denotes the union (or combination). Moments and central moments of the probability distribution of X can be indirectly compared to moments and central moments of the probability distribution of Y by comparing instead moments and central moments of the distributions of Z and Y.

DESCRIPTION OF THE PREFERRED EMBODIMENTS

Figure 1A:
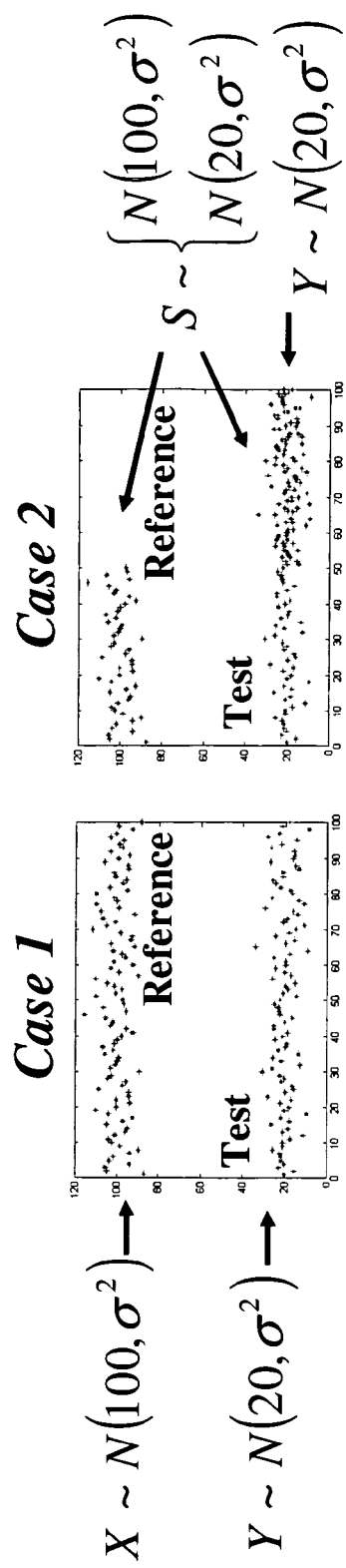
FIGS. 1A-1C illustrate the principle of indirect comparison and its advantage over conventional direct comparison between two simulated data samples.

Conventional techniques produce high numbers of meaningless detections in digitized scenes because these techniques do not address explicitly all of the most common spatial/spectral variability occurrences that may be observed locally in the imagery. To better understand the behavior of conventional anomaly detectors, five known techniques were applied to actual HS imagery, including the industry standard, and decomposed the most probable spatial/spectral variability occurrences into three study cases (Case 1, Case 2, and Case 3), where Case 1 represents a comparison between two samples from distinct distributions (e.g., land vehicle and grass), Case 2 represents a comparison between a two-material sample and a sample of one of the two materials (e.g., a spatial transition between tree shadows and surrounding terrain), and Case 3 represents a comparison between two samples from the same distribution (e.g., grass and grass). Simulations and inspection of these conventional detectors' performances on actual HS data showed that the application of conventional techniques to local anomaly detection problems is flawed. The conventional techniques are developed to account explicitly for Case 1 and Case 3, but not for one of the most abundant case-Case 2. Case 2 occurs quite often on digital scenes, and represents major transitions of regions, and also strong edges due to the presence of manmade objects in a natural clutter background. Using an indirect comparison technique, described below, Case 2 is handled in a greatly improved manner.

In an indirect comparison, samples are not compared as individual entities, but as individual entities and the union among these entities. Let X and Y denote two random samples, denote X a reference sample and let Z=X U Y, where U denotes the union. Features of the distribution of X can be indirectly compared to features of the distribution of Y by comparing instead features of the distribution of Z to features of the distribution X. Anomaly detection algorithms based on this principle enjoy the desirable outcome of preserving what is often characterized by image analysts as meaningful detections (e.g., a manmade object in an open terrain), while significantly reducing the number of meaningless detections (e.g., transition of different regions).

Statistical approaches were developed that implement the principle of indirect comparison through a semiparametric model, which is discussed later. This model assumes that the distributions of X and Y (using the denotation above) are related by an exponential distortion. A statistical hypothesis test is then applied to decide whether the exponential distortion is significant. If the distortion is significant, then X and Y are declared anomalous in respect to each other. This model requires that all the components of X and Y are independent, identically distributed (iid) by their corresponding distributions. An alternative detector based on the fundamental behaviors of different mathematical terms in the semiparametric test statistic was also developed; the alternative detector (AsemiP) is based on an iid nonparametric model, which also uses the principle of indirect comparison, and on fundamental theorems of large sample theory. In comparative terms, the AsemiP detector can approximate the performance of the semiparametric detector on actual imagery, and it is significantly easier to implement.

To approximate the iid assumptions by the improved methods using actual HS imagery, an example apparatus was developed that introduces a variability window to generate features from a test patch in the image and from its associated reference window. Features are extracted from the image and labeled as reference or test features by applying a high pass filter (HPF) in the spectral domain and using a metric based on the vector angle between data from the variability window and data from the reference window (Reference-Feature), and on the vector angle between data from the variability window and data from the test window (Test-Feature). The invention constitutes, in this example, the comparison between the information contained in Reference-Feature with the information in Test-Feature using the principle of indirect comparison via the detectors SemiP or AsemiP. This test is performed across the image.

In another example, Reference-Feature is generated by obtaining a priori spectral data from the most abundant object classes (e.g., general terrain, tree leaves, natural rocks), expected in a given scene, and (after the application of a HPF in the spectral domain) computing the vector angles between individual spectra (variability spectra) and the sample mean of these spectra. Notice that contrary to the previous example, the information in Reference-Feature is fixed. The information in Test-Feature is generated by applying a HPF in the imagery's spectral domain and by computing the vector angles between the variability spectra and the sample mean of test spectra from a given location in the digitized scene. Test-Feature is adaptive, since the test is performed across the image. Comparing Reference-Feature and Test Feature, as described in this example, using the principle of indirect comparison via the detectors SemiP or AsemiP constitutes the invention applied to this example.

In these examples, the improved apparatus and methods significantly outperformed conventional detectors performing the same task. The indirect comparison approach reduces the number of nuisance anomaly detections near discontinuities, such as shade boundaries or tree-lines within an image, while accentuating object classes most meaningful for an image analyst (e.g., land vehicle in a natural clutter scene).

Description of improved apparatus and methods are discussed in four parts: A principle of indirect comparison; improved apparatus and method 1, the semiparametric (SemiP) detector; improved apparatus and method 2, the approximation of SemiP (AsemiP) detector; and application to two types of anomaly detection scenarios using actual hyperspectral imagery, one from the top view perspective and another from a ground level view perspective, which includes comparison to alternative conventional techniques.

Figure 1C:
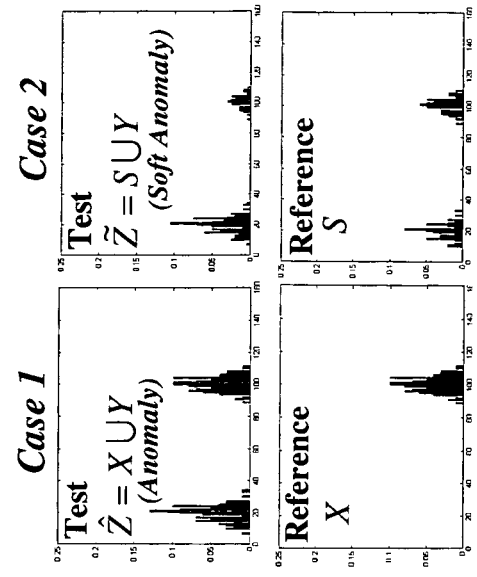
Figure 1B:
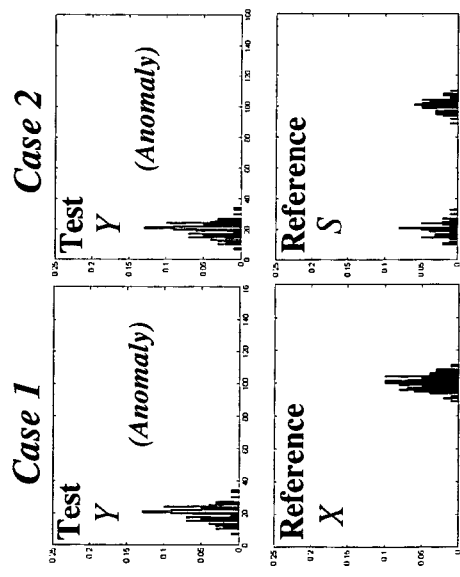

The advantage of comparing samples using an indirect comparison, in contrast to a conventional method, is illustrated in FIGS. 1A-1C.

Random samples were simulated in order to show the benefits of indirect comparison in the context of anomaly detection, as shown in FIGS. 1A-1C. A random sample, by definition, is a sequence of random variables, e.g., $X=(X_1, X_2, \ldots, X_n)$, where $X_i$ is independent of $X_j$ ($i \neq j$). Two study cases, labeled Case 1 and Case 2, are shown in FIG. 1A, where Case 1 depicts the realization of two random samples from different distributions, and Case 2 depicts the realization of a composite sample and a pure one.

FIG. 1A, Case 1, shows the simulated realizations of two random samples, X and Y; their random variables are Normally distributed having the same variance ($\sigma^2$), but significantly different means, 100 and 20, or $X_i \sim N(100, \sigma_2)$ and $Y_i \sim N(20, \sigma^2)$, where $X_i$ and $Y_i$ are random variables of X and Y, respectively, and i=1, \ldots, 100. The vertical axis represents realized values and the horizontal axis represents index i. FIG. 1A, Case 2, shows the simulated realizations of an additional random sample, S, which is composed of a sequence from two Normal distributions, $S \sim [N(100, \sigma^2)$ or $N(20, \sigma^2)]$, and the same realization of Y.

Let X and S be reference samples and Y be a test sample. A comparison is made of X to Y using the conventional method (i.e., comparing samples as individual entities) and using an improved method according to an example of the present invention, in this example comparing individual entities to the union of entities, and repeating that comparison between S and Y. Comparison between random samples often implies a comparison among the moments and/or central moments of their distributions, thus, empirical distributions (normalized histograms) of these random samples were computed, and comparisons are possible by visual inspection of the results.

In FIG. 1B, under CONVENTIONAL, Case 1, the empirical distributions of the test sample Y and the reference sample X are shown. Both empirical distributions resemble a relatively tight Gaussian distribution, having the same variance but centered at different means, as expected. By visual inspection, one would expect that statistical methods using the conventional way would be able to distinguish the distribution of Y from the distribution of X—in the bases of their means being so apart, hence, declaring Y as an anomaly in comparison to X. In Case 2, under CONVENTIONAL, by visual inspection alone, one would also expect Y to be declared as an anomaly in respect to S for the obvious fact that the bimodal distribution of S is quite different from the unimodal distribution of Y. Correct as this declaration may be, it is also unfortunate, because these two study cases are often found together in real image processing problems.

For instance, in a real scenario, Case 1 could represent a comparison between a random sample X from a motor vehicle and a sample Y from the surrounding natural terrain. Similarly, Case 2 could represent a comparison between a composite sample (S) from a transition of regions (terrain and tree shadow) and the pure sample (Y) from terrain. A conventional anomaly detector may not be able to distinguish between Case I and Case 2; furthermore, in many circumstances, it may even declare Case 2 a stronger anomaly than Case 1, yielding instead results that are more comparable to those of edge detectors.

Under UNION in FIG. 1C, the empirical distribution of the sample union $\hat{Z}$ which is bimodal in Case 1, is quite different from the corresponding unimodal distribution of X. This fact shall preserve the desirable declaration that X and Y are samples from different distributions. What shall not be preserved under UNION, however, is the unfortunate outcome under CONVENTIONAL, Case 2, since the empirical distributions of the sample union $\tilde{Z}$, in Case 2, and the composite sample S have the same general characteristics: they are bimodal. Therefore, under UNION, one would expect the differences between X and Y in Case 1 to be accentuated and the differences between S and Y in Case 2 to be suppressed, as it would be desired.

The outcomes under both CONVENTIONAL and UNION are expected to be trivial and comparable when both reference and test samples belong to the same distribution, so this case is not discussed further.

The SemiP and AsemiP anomaly detectors are based on this simple principle and produce the desirable outcome of preserving what is often characterized by image analysts as meaningful detections (e.g., a manmade object in an open terrain), while significantly reducing the number of meaningless detections (e.g., transition of different regions, strong edges).

Translating this discussion to an actual scenario, consider an image containing three types of image data, sunlit ground, shaded ground, and objects of interest. A shade boundary runs across part of the image, separating shaded ground and sunlit ground. Supposing the test window includes sunlit ground close to the shade boundary, and the reference window, surrounding the test window, happens to include both shaded and sunlit ground. In a conventional algorithm, the test window (sunlit ground) is compared directly with the reference window (a mixture of shaded and sunlit ground), and an anomaly would be detected as the test window data and reference window data are substantially different. However, in an improved method, the test window data and reference window data are combined, to provide combination data, and the combination is then compared with one of the windows (the test window or reference window). Novel algorithms are described, which provide a softer (less significant) anomaly detection if the combination data and individual window data include common data features. In this example, the test window includes sunlit ground, and the reference window includes some sunlit ground, and so a softer anomaly is detected. However, if the test window includes the object of interest, and the reference window includes sunlit and shaded ground, but not the object of interest, a stronger anomaly is detected.

Figure 2:
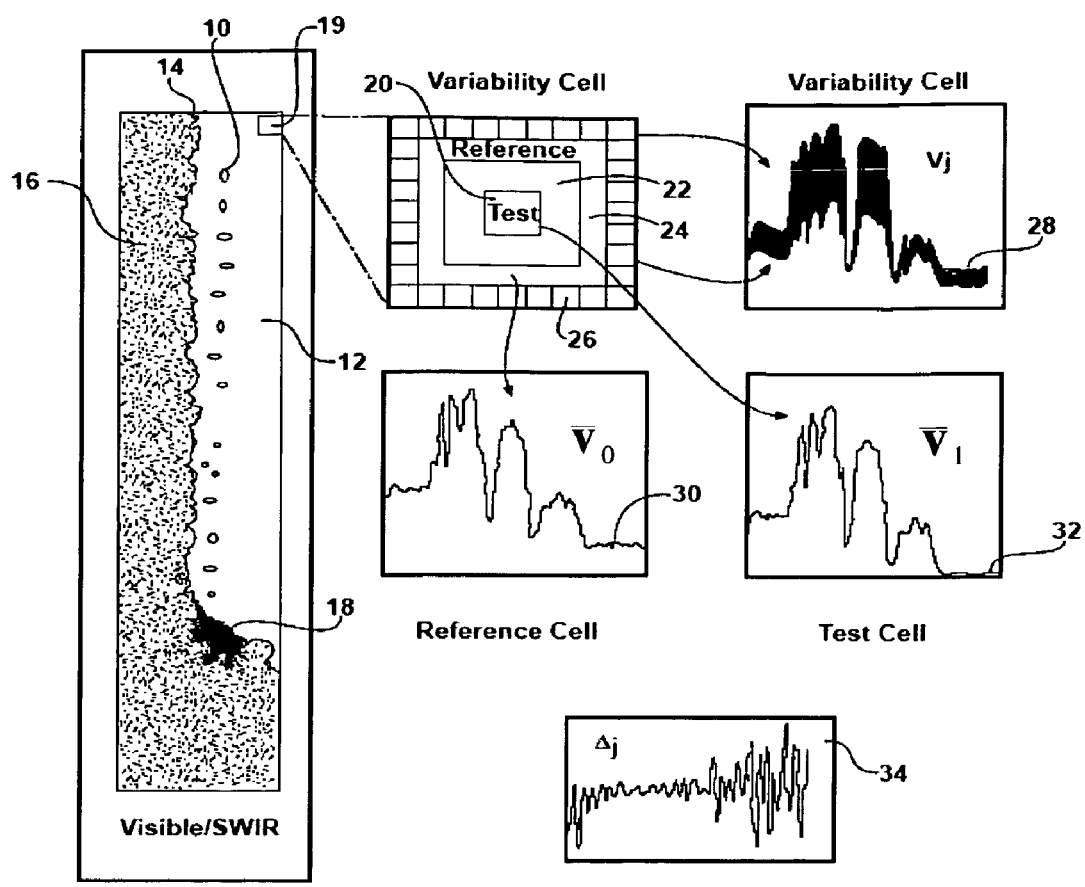
FIG. 2 shows a schematic illustrating anomaly detection in a multicomponent scene, such as from a hyperspectral digital image collection.

FIG. 2 shows a schematic illustrating anomaly detection according to an example of the present invention within a multi-component scene. The scene shown in the schematic corresponds to an actual scene used, the hyperspectral scene from the U.S. Army's Forest Radiance I database (collected by the HYDICE hyperspectral sensor at Aberdeen Proving Ground in Maryland) illustrated in FIG. 5A. The scene includes a number of ground vehicles, such as vehicle 10, parked across a grassy area 12 close to a tree-line 14, with trees 16 in the left of the scene, and shade regions 18. A sampled area of the scene is shown at 19.

In this example, the sampling mechanism uses a test window 20, guard region 22, reference window 24, and variability window 26. The test window (alternatively referred to as a test cell) provides a spectral sample average ($\bar{v}_1$) from a (w×w) window; the reference window (alternatively referred to as a reference cell) provides a spectral sample average ($\bar{v}_0$) from M vectors surrounding the guard region. The guard region is a blind area between test and reference windows to account for larger than (w×w) targets. The variability window (also referred to as a variability cell) provides J individual spectral vectors ($v_j$) each consisting of k=1, ..., K spectral responses ($\lambda_{jk}$) for K distinct wavelengths in the visible to SWIR (shortwave infrared) region of the electromagnetic spectrum, for example the region from 0.4 µm to 2.4 µm.

The figure shows the test spectrum 32 obtained from the test window 20, the reference spectrum 30 obtained from the reference window 24, and the plurality of variability spectra 28 obtained from portions of the variability window. The figure also shows a high-pass filtered test spectrum 34, discussed further below.

Figure 3A:
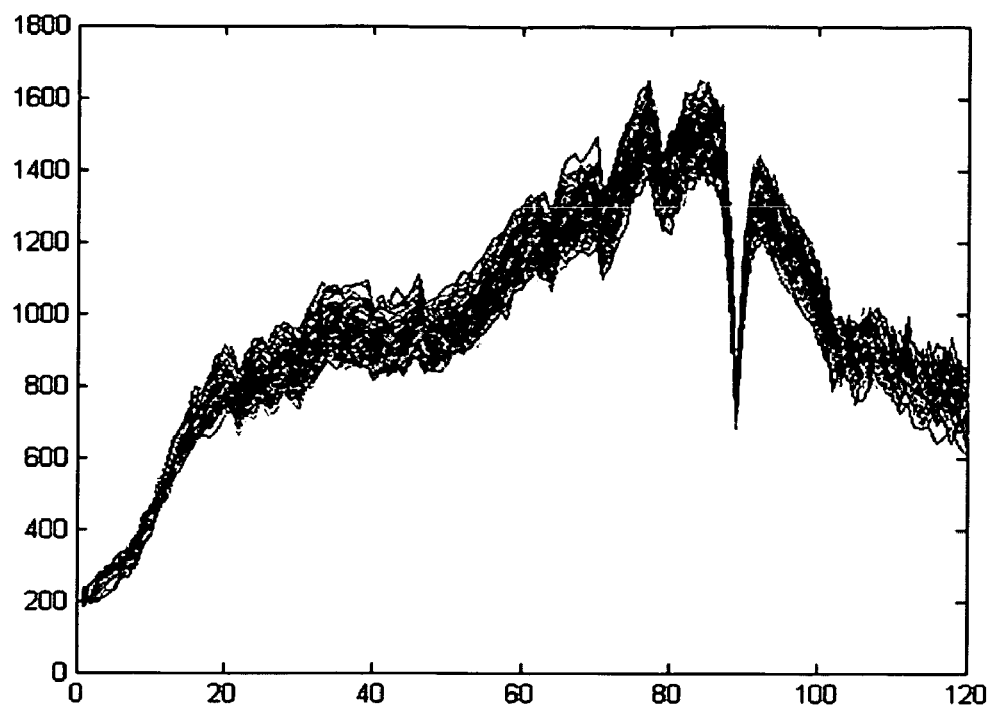
FIG. 3A illustrates a set of 100 spectral samples from a highly correlated natural clutter background, where the vertical axis represents radiance ($Wcm^{-2}sr^{-1}\mu m^{-1}$) and the horizontal axis represents band 1 (0.4 μm) to band 120 (0.97 μm)
Figure 3B:
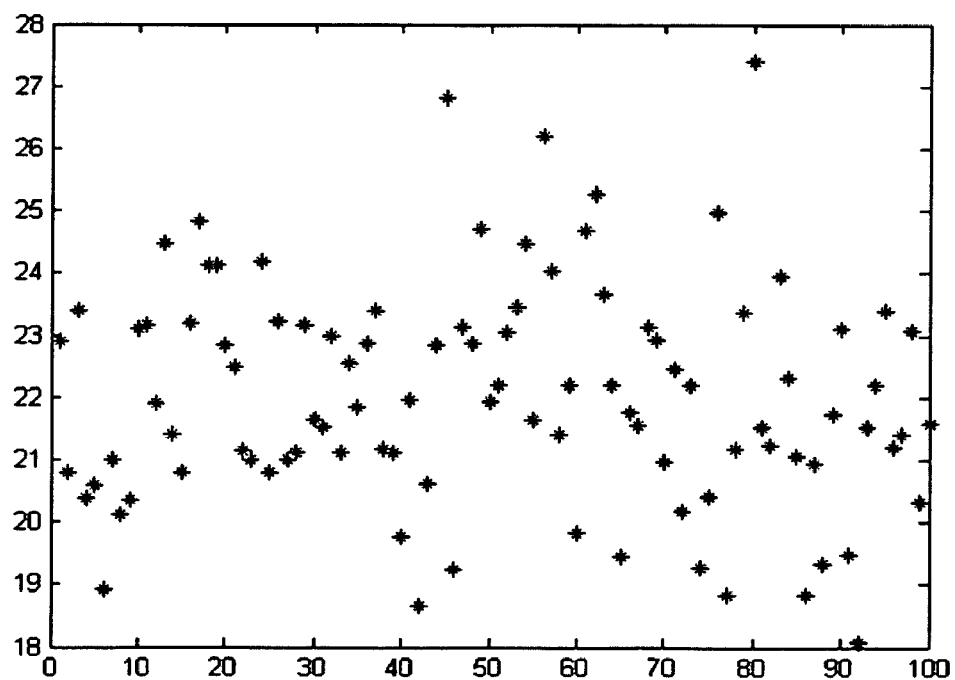
FIG. 3B illustrates the correlated spectral samples in FIG. 3A after a transformation using a high pass filter in the spectral domain, followed by a vector angle mapping, where the vertical axis represents angle difference in degrees, and the horizontal axis represents spectral sample number—the samples shown being good approximation of independent, identically distributed (iid) observations.

Hyperspectral data have highly correlated—hence, dependent—spatial and spectral clutter, so to promote statistical independence, given that this assumption is made in the models, a high-pass (HP) filter is applied in the spectral domain, thus transforming $v_j$ into $\Delta_j$, and then $\Delta_j$ is used to compute a feature, which promotes spatial independence. The rationale for these transformations is discussed further below. The feature is known as spectral angle mapper (SAM), which in essence computes the angle between two vectors, or $$x_{ij} = \frac{180}{\pi} \arccos\left(\frac{\Delta_j^t \bar{\Delta}_i}{\|\Delta_j\|\|\bar{\Delta}_i\|}\right), \quad (1)$$

where, $\Delta_j = (\lambda_{j,2} - \lambda_{j,1}, \ldots, \lambda_{j,K} - \lambda_{j,(K-1)})^t$ is the high pass filtered version of $v_j$; $\bar{\Delta}_i$ is the high pass filtered version of $\bar{v}_i$; i=0 (reference cell), 1 (test cell); j=1, ..., J (J is the number of pixels in the variability cell); $x_i = (x_j) = (x_{i1}, \ldots, x_{iJ})$ is a random sequence of angle differences ranging from 0 to 90 degrees (0 representing minimum class difference between reference and test samples and 90 representing the maximum class difference between these samples); the operator $\|z\|$ denotes the squared root of $z^t z$; and $[\cdot]^t$ denotes the vector transpose operator. FIG. 3B depicts the transformed version of a highly spatially/spectrally correlated set of hyperspectral samples (as shown in FIG. 3A) from a grassy area in a Californian valley. Transformed data, as shown in FIG. 3B, are a good approximation to a set of statistically independent feature values, hence, they can be used as input to the detectors according to examples of the present invention.

FIG. 3A shows a set of 100 spectral samples from a highly correlated natural clutter background, where the vertical axis represents Radiance (Wcm$^{-2}$sr$^{-1}$µm$^{-1}$) and the horizontal axis represents band 1 (0.4 µm) to band 120 (0.97 µm).

FIG. 3B illustrates the correlated spectral samples in FIG. 3A after a transformation using a high pass filter in the spectral domain, followed by a vector angle mapping. The vertical axis represents angle difference in degrees, and the horizontal axis represent spectral sample number. The samples shown are good approximation of iid observations.

Let $x_0$ denote a reference feature sample (alternatively referred to as the reference feature set), $x_1$ a test feature sample (alternatively referred to as the test feature set), and let both samples be distributed (~) by unknown joint distributions $f_0$ and $f_1$, respectively, or $$x_1 = (x_{11}, \ldots, x_{1n_1}) \sim f_1(x)$$

$$x_0 = (x_{01}, \ldots, x_{0n_0}) \sim f_0(x) \quad (2)$$

where, $n_0 = n_1 = J$ in this particular implementation.

The window cells are expected to draw samples and to move systematically across the entire imagery, and at each location a detector attempts to answer the following question: Do $x_0$ and $x_1$ belong to the same population, or class?

As it was discussed for the simulated example in FIG. 2, a conventional two-sample hypothesis test would work very well if samples $x_0$ and $x_1$ do belong to distinct classes $C_0$ and $C_1$, or to one of these classes. Problems occur, however, when one of the samples (e.g., $x_0$) belongs to a composite class consisting of both classes $C_0$ and $C_1$, denote $x_0(C_0C_1)$, and then it is compared to $x_1(C_1)$. In those cases, standard statistical tests may reject the hypothesis that $x_0(C_0C_1)$ and $x_1(C_1)$ belong to the same class. This rejection—correctly as it may seem—is arguably the most dominant driving force affecting the number of false alarms (FA) produced by most—if not all—local anomaly detectors using sensor imagery. The reason, as discussed, is that region discontinuities (e.g., boundaries between tree clusters and their shadows) are abundant in sensor imagery, and they are not taken into account in conventional statistical models.

The principle of indirect comparison allows circumvention of this problem. The mathematics of novel algorithms (SemiP and AsemiP detectors) using this principle are discussed in details.

Semiparametric (Logistic) Model

Let the random sequences $x_k$ have their components independently, identically distributed (iid). Let $x_0$ be independent of $x_1$. And consider the following:

$$x_1 = (x_{11}, \ldots, x_{1n_1}) iid \sim g_1(x)$$

$$x_0 = (x_{01}, \ldots, x_{0n_0}) iid \sim g_0(x), \tag{3}$$

$$\frac{g_1(x)}{g_0(x)} = \exp(\alpha + \beta h(x)), \tag{4}$$

where $g_1$ is regarded as an exponential distortion of $g_0$ and $h(x)$ is an arbitrary but known function of x. Note in (3)-(4) that no parametric assumption is given to go and that $g_1$ depends only on the unknown parameters $\alpha$ and $\beta$, hence, justifying the model's name: semiparametric.

The rationale for proposing to use (4) as the baseline, is that many common distribution families can be expressed as a canonical exponential function. These families fall under a category of probability density functions called exponential families, which are known to have many attractive mathematical and statistical properties. Some of these properties are discussed, for instance, in G. Casella and R. L. Berger, Statistical Inference, Belmont, CA: Duxbury Press, 1990, pp. 112-120, 184, 222.) One of these mathematical properties, for example, is that an exponential-family distribution can be expressed as a shift of another exponential-family distribution, as shown in (4). Further details can be found in R. Kay and S. Little, "Transformations of the explanatory variables in the logistic regression model for binary data," Biometrika, vol. 74, 495-501, 1987.

Using the independence assumptions in model (3)-(4), with $h(x)=x$, the MLE (maximum likelihood estimate) of $\alpha$ and $\beta$ can be attained via the likelihood function, $$\zeta(\alpha, \beta, g_0) = \prod_{i=1}^{n_0} g_0(x_{0i}) \prod_{j=1}^{n_1} \exp(\alpha + \beta x_{1j}) g_0(x_{1j}) \tag{6}$$

$$= \prod_{i=1}^{n=n_1+n_0} g_0(t_i) \prod_{j=1}^{n_1} \exp(\alpha + \beta x_{1j}).$$

where, $n=n_0+n_1$ and the sequence of combined features (alternatively referred to as the combined feature set) t is $$t = (x_{11}, \ldots, x_{1n_1}, x_{01}, \ldots, x_{0n_0}) = (t_1, \ldots, t_n). \tag{7}$$

Notice in (6) that the part involving $g_0(t_i)$ (reference distribution) reflects the combined-sample property of a sought model, and the part involving the exponential distortion reflects only the property of the sample that is not the reference. Both properties fit well into a proposed framework of merging samples and then, in some form, comparing this combined structure with one of its original samples.

Notice also that $g_0$ in (6) is unknown, thus, deriving MLE of $\alpha$ and $\beta$ via standard procedures cannot be attained; however, using profiling one can express $g_0$ in terms of $\alpha$ and $\beta$ and then replace $g_0$ with its new representation back in (6). Using profiling, the method of Lagrange multiplier has been proposed (see J. A. Anderson, "Separate sample logistic discrimination," Biometrika, 59, 19-35, 1972) to attain the maximization of $\zeta$ by fixing $(\alpha, \beta)$ and then maximizing $\zeta$ with respect to $g_0(t_i)$ for $i=1, \ldots, n$, subject to constraints $$\Sigma g_0(t_i) = 1, \ g_0(t_i) > 0,$$

$$\Sigma [\exp(\alpha + \beta t_i) - 1] g_0(t_i) = 0, \tag{8}$$

where the last constraint reflects the fact that $\exp(\alpha + \beta x) g_0(x)$ is a distribution function. Following this approach, it can be shown (see J. Qin and B. Zhang, "A goodness of fit test for logistic regression models based on case-control data," Biometrika, 84, 609-618, 1997) that the maximum value of $\zeta$ is attained at $$g_0(t_i) = \frac{1}{n_0} \frac{1}{1 + \rho \exp(\alpha + \beta t_i)}, \tag{9}$$

where $\rho = n_1/n_0$, and that ignoring a constant, the log-likelihood function is $$l(\alpha, \beta) = \sum_{j=1}^{n_1} (\alpha + \beta x_{1i}) - \sum_{i=1}^{n} \log[1 + \rho \exp(\alpha + \beta t_i)]. \tag{10}$$

A system of score equations that maximizes (10) over $(\alpha, \beta)$ is shown below, $$\frac{\partial l(\alpha, \beta)}{\partial \alpha} = -\sum_{i=1}^{n} \frac{\rho \exp[\alpha + \beta t_i]}{1 + \rho \exp[\alpha + \beta t_i]} + n_1 = 0 \tag{11}$$

$$\frac{\partial l(\alpha, \beta)}{\partial \beta} = -\sum_{i=1}^{n} \frac{t_i \rho \exp[\alpha + \beta t_i]}{1 + \rho \exp[\alpha + \beta t_i]} + \sum_{j=1}^{n_1} x_j = 0. \tag{12}$$

Let $(\alpha^*, \beta^*)$ satisfy (11)-(12), then using (9) it can be shown that the MLE of $g_0(x)$ is $$\hat{g}_0(t_i) = \frac{1}{n_0} \frac{1}{1 + \rho \exp(\alpha^* + \beta^* t_i)}. \tag{13}$$

The SemiP Algorithm—Theory Adapted to Object Detection:

The theory described above was adapted to the framework of anomaly detection. The mathematics for this adaptation is nontrivial, as the asymptotic behavior of $(\alpha^*, \beta^*)$ is employed under a model that does not assume Normality. The important parts of the mathematical development are described below.

First, notice that for $g_1(x)=\exp(\alpha+\beta x)g_0(x)$ to be a density, a hypothesis of $\beta=0$ in (4) must imply $\alpha=0$, as the term $\exp(\alpha)$ functions as a normalizing factor so that $g_1$ integrates over x to a total mass unity. Second, notice that the hypothesis $H_0$: $\beta=0$ (given that $\alpha$ must also be equal to zero) in (4) implies that a test population and a reference (control) population are equally distributed, namely, $g_1=g_0$. With this logic, one can design an anomaly detector from the following composite hypothesis test:

$H_0: \beta=0 (g_1=g_0)$ anomaly absent $H_1: \beta \neq 0 (g_1 \neq g_0)$ anomaly present. (14)

Under this test, local regions in the entire imagery would be individually tested to reject the null hypothesis ($H_0$) yielding in the process a binary surface of values of 1, depicting a rejection of $H_0$, and values of 0, depicting a non-rejection of $H_0$. An isolated object in a scene would be expected to produce a cluster of 1 values (anomalies) in the resulting binary surface. But to design the hypothesis test in (14), one must know the asymptotic behavior of the extremum estimator $\beta^*$. Lemma 1 is relevant to estimators based on function maximization with respect to unknown parameters.

Lemma 1. Assumptions:

(i) Let $\Theta$ be an open subset of the Euclidean K-space. (Thus the true value $\theta_o$ is an interior point of $\Theta$.)

(ii) $Q_T(y, \theta)$ is a measurable function of vector y for all $\theta \in \Theta$ and $\partial Q_T/\partial \theta$ exists and is continuous in an open neighborhood $N_1(\theta_o)$ of $\theta_o$. (Note that this implies $Q_T(y, \theta)$ is continuous for $\theta \in N_1$, where T is the sample size.)

(iii) There exists an open neighborhood $N_2(\theta_o)$ of $\theta_o$ such that $T^{-1} Q_T(\theta)$ converges to a nonstochastic function $Q(\theta)$ in probability uniformly in $\theta$ in $N_2(\theta_o)$, and $Q(\theta)$ attains a strict local maximum at $\theta_o$.

Let $\Theta_T$ be set of roots of the equation $$\frac{\partial Q_T}{\partial \theta} = 0 \quad (15)$$

corresponding to the local maxima. If that set is empty, set $\Theta_T$ equals to $\{0\}$.

Then, for any $\epsilon > 0$, $$\lim_{T \to \infty} P\left[\inf_{\theta \in \Theta_T} (\theta - \theta_0)(\theta - \theta_0) > \varepsilon\right] = 0. \quad (16)$$

In essence, Lemma 1 affirms that there is a consistent root of (15). (Regarding this proof, and also the proof of Theorem 1 following, see T. Amemiya, *Advanced Econometrics*, Cambridge, Mass.: Harvard U. Press, 1985, pp. 110-112). Under certain conditions, a consistent root of (15) is asymptotically Normal. The affirmation is shown in Theorem 1, where asymptotic convergence is denoted by $A \to B$.

Theorem 1. Assumptions:

(i) All the assumptions of Lemma 1.

(ii)

$$\frac{\partial^2 Q_T}{\partial \theta \partial \theta'}$$

exists and is continuous in an open, convex neighborhood of $\theta_o$.

(iii)

$$\frac{\partial^2 Q_T}{\partial \theta \partial \theta'}$$

converges to a finite nonsingular matrix $$S(\theta_0) = \lim E\left[T^{-1}\left(\frac{\partial^2 Q_T}{\partial \theta \partial \theta'}\right)_{\theta_0}\right]$$

in probability for any sequence $\theta_T^*$ such that $\theta_T^* = \theta_0$.

$$(iv) \sqrt{T}\left(\frac{\partial Q_T}{\partial \theta}\right)_{\theta_0} \to N[0, V(\theta_0)], \text{ where} \quad (17)$$

$$V(\theta_0) = \lim E\left[T^{-1}\left(\frac{\partial Q_T}{\partial \theta}\right)_{\theta_0} \times \left(\frac{\partial Q_T}{\partial \theta'}\right)_{\theta_0}\right]. \quad (18)$$

Let $\{\hat{\theta}_T\}$ be a sequence obtained by choosing one element from $\theta_T$ defined in Lemma 1 such that $\hat{\theta}_T \to \theta_0$.

Then $\sqrt{T}(\hat{\theta}_T - \theta_0) \to N(0, \Sigma)$, where (19)

$\Sigma = S(\theta_0)^{-1} V(\theta_0) S(\theta_0)^{-1}$. (20)

The semiparametric model's MLE solution satisfies the assumptions of Lemma 1, including of course (15) via (11) and (12). Therefore, by Lemma 1, $(\alpha^*, \beta^*)$ is consistent and, as seen by Theorem 1, it converges asymptotically to a Normal distribution.

Under $H_0$: $\beta=0$ $(g_1=g_0)$, the following notation for the moments of t (the combined sample sequence) are used with respect to the reference distribution $g_0$:

$E(t^k) \equiv \int t^k g_0(t) dt$, $Var(t) \equiv E(t^2) - E^2(t)$ (21)

Let $(\alpha_0, \beta_0)$ be the true value of $(\alpha, \beta)$ under model (3)-(4) and assume $\rho = n_1/n_0$ remains constant as both $n_1$ and $n_0$ go to infinity. Define $$\nabla \equiv \left(\frac{\partial}{\partial \alpha}, \frac{\partial}{\partial \beta}\right)$$

and notice from (11) and (12) that $E[\nabla l(\alpha_0, \beta_0)] = 0$. Under the null hypothesis ($H_0$: $\beta=0[g_1=g_0]$), using (4), (9), (11), (12) and (21) one can verify that $$-\frac{1}{n}\frac{\partial^2 l(\alpha_0, \beta_0)}{\partial \alpha \partial \beta} \to K_1 \int \frac{t \exp(\alpha_0 + \beta_0 t)}{1 + \rho \exp(\alpha_0 + \beta_0 t)} g_0(t) dt = \quad (22)$$

$$K_2 \int t \cdot g_0(t)[\exp(\alpha_0 + \beta_0 t)g_0(t)] dt = \frac{\rho}{1+\rho} E(t),$$

where $K_1$ and $K_2$ are constants involving $(n_1, n_0)$ and $\rho/(1+\rho) = n_1/n$ (where $n = n_1 + n_0$). Using similar argument to arrive at (22) and applying the weak law of large numbers (WLLN)

(see, for instance, E. L. Lehmann, Theory of Point Estimation, Pacific Grove, CA: Wadsworth & Brooks, 1991, pp. 333-336, and Chapter 5), one can use assumption (iii) in Theorem 1 to recognize that $$-\frac{1}{n}\nabla\nabla' l(\alpha_0, \beta_0) \to S = \frac{\rho}{1+\rho}\begin{pmatrix} 1 & E(t) \\ E(t) & E(t^2) \end{pmatrix} \quad (23)$$

in probability as $n \to \infty$. It follows that S is nonsingular and its inverse is $$S^{-1} = \frac{1}{E(t^2) - E^2(t)}\begin{pmatrix} E(t^2) & -E(t) \\ -E(t) & 1 \end{pmatrix}\frac{1+\rho}{\rho}. \quad (24)$$

Our interest is only in the parameter $\beta$, so, let $S_\beta$ denote the lower-right component of the expanded version of $S^{-1}$ and use (21) to obtain $$S_\beta = \frac{1}{E(t^2) - E^2(t)}\frac{1+\rho}{\rho} = \frac{1}{\text{Var}(t)}\frac{1+\rho}{\rho}. \quad (25)$$

Using also the application of the central limiting theorem (CLT) in Theorem 1 (iv) and the fact that $$E[\nabla l(\alpha_0, \beta_0)] = 0, \quad (26)$$

from (11) and (12), one can write $$\sqrt{n}[\nabla l(\alpha_0, \beta_0)] \to N[0, V(\alpha_0, \beta_0)], \quad (27)$$

where $$V(\alpha_0, \beta_0) = \frac{\rho}{1+\rho}\begin{bmatrix} 1 & E(t) \\ E(t) & E(t^2) \end{bmatrix} - \rho\begin{bmatrix} 1 \\ E(t) \end{bmatrix}[1 \ E(t)] \quad (28)$$

$V(\alpha_0, \beta_0)$ is a direct result from (18), see, for instance, J. Qin and B. Zhang, "A goodness of fit test for logistic regression models based on case-control data," Biometrika, 84, 609-618, 1997. Using the conclusion of Theorem 1, or (19)-(20), in terms of $S_\beta$ in (25) and the lower-right component of the expanded version of $V(\alpha_0, \beta_0)$ in (28), one can verify that $$\sqrt{n}\beta^* \to N\left(0, \frac{\rho^{-1}(1+\rho)^2}{\text{Var}(t)}\right) \quad (29)$$

and having the left side of (29) normalized by the asymptotic variance and then squared, one can conclude (see convergence results, for instance, in G. Casella and R. L. Berger, Statistical Inference, Belmont, CA: Duxbury Press, 1990, pp. 112-120, 184, 222) that the resulting random variable $$\chi = n\rho(1+\rho)^{-2}\beta^{*2}V^*(t) \to \chi_1^2 \quad (30)$$

converges to a chi square distribution with 1 degree of freedom, where $V^*(t)$ estimates Var(t). A multivariate solution is presented in K. Fokianos, et al., "A semiparametric approach to the one-way layout," Technometrics, pp. 56-65, 2001.

The expression in (30) constitutes the SemiP anomaly detector.

Statistical Independence Assumptions:

Model (3)-(4) is clearly based on idealized assumptions, which in the context of relatively high resolution imagery, the best one could hope for is that in the presence of certain types of terrain those assumptions would not be grossly violated. The assumptions dictate that not only $x_0$ must be statistically independent of $x_j$, their corresponding components $x_{0j}$ and $x_{ij}$ (j=1, . . . , J) must be iid. For those assumptions not to be violated in HSI, the information in the spatial domain must be independent, as well as the information in the spectral domain.

Above, two transformations were described, aimed at promoting statistical independence in both domains: apply a HP (high pass) filter in the spectral domain, followed by a spatial SAM. These transformations use the same basic idea: Let the random variables $y_1$, $y_2$ and $y_3$ be statistically dependent and let $z_1 = y_2 - y_1$ and $z_2 = y_3 - y_2$. It can be shown (see, for instance, B. Kedem, Time Series Analysis by Higher Order Crossings, New York: IEEE Press, 1994, pp. 260-266) that $z_1$ is statistically independent of $z_2$. This transformation is widely used by professional statisticians so that dependent random variables can be addressed using techniques based on statistical independence. The spectral information was high-pass filtered ($\Delta_j = \lambda_{jk} - \lambda_{j(k-1)}$) prior to the application of SAM, so that SAM interpreted as the angular difference between two vectors. Hence, it can be shown that the spatial angular differences between two highly correlated random vectors then yield independent random variables.

Implementation of SemiP Detector

Referring again to FIG. 1, this shows a nonhomogeneous, multicomponent scene from a hyperspectral digital imagery collection experiment (HYDICE). A pixel in a HYDICE imagery is represented by a vector.) Typically, local anomaly detectors produce an intolerable high number of false alarms (non-anomalies) in similar scenes; local region discontinuities degrade detectors' performances.

Implementation of the SemiP algorithm is described below:

1) Sampling Mechanism: Use the mechanism described above to sample a pair of random feature vectors $x_{ij}$ (i=0 [reference], 1 [test]; j=1, . . . , J) from HSI. A 9-pixel (3×3) test window, a 56-pixel reference window, and a 60-pixel variability window were used, as shown in FIG. 1. Note that the size of the variability window determines the size of the feature vectors, that is, $x_{0j}$ and $x_{1j}$; have the same size, J=60. In other examples, the variability window and reference window can be partially or entirely co-extensive.

2) Statistical Independence: An attempt should be made to promote statistical independence in HSI, discussed further elsewhere.

3) Function Maximization: Perform an unconstrained maximization of $l(\alpha, \beta)$ in (10), or minimization of $[-l(\alpha, \beta)]$, to obtain the extremum estimates ($\alpha^*, \beta^*$). A standard unconstrained minimization routines available in MATLAB™ software (i.e., fminsearch) can be used, and the initial values of ($\alpha, \beta$) are set to (0,0).

4) Variance Under the Null Hypothesis: $V^*(t)$ in (30) should be computed using (13) and a discrete version estimate of (21):

$$\hat{E}(t^k) = \Sigma_i t_i^k \hat{g}_0(t_i) V^*(t) = \hat{E}(t^2) - \hat{E}^2(t) \quad (31)$$

5) Decision Threshold: Using (30), high values of $\chi$ reject hypothesis $H_o$, hence, detecting anomalies. Set a decision threshold based on the Type I error, i.e., based on the probability of rejecting $H_o$ given that $H_o$ is true. Using a standard integral table for the chi square distribution, with 1 degree of freedom, find a threshold that yields an acceptable probability of error (e.g., 0.001), or alternatively find and use a suitable threshold that yields a value at the knee of the SemiP's corresponding ROC curve.

The AsemiP Algorithm

In reference to (30), there are two major factors working in harmony and in complementary fashion to promote maximum separation between signal (anomalies) and noise (non-anomalies), they are: the squared value of $\beta^*$ and the estimated combined variance, $V^*(t)$, which is also quadratic.

These factors work in the following way: When two samples from the same class are compared (i.e., is $H_0$: $\beta=0$ [$g_1=g_0$] true?), the term $(\beta^*)^2$ tends to approach zero very fast, especially for $\beta^*$ values less than unity. On the other hand, if two samples from distinct classes are compared, the term $V^*(t)$ tends to a relatively high number, also very fast, asserting the fact that a combined sample vector t consists of components belonging to distinct populations.

Motivated by these properties, an approximation algorithm is stated and proved, based on large sample theory that replaces complicated SemiP equations with simpler ones describing the same phenomenon.

Proposition 1 (AsemiP Algorithm). Let $$x_1 = (x_{11}, \ldots, x_{1n_1}) \text{ be iid}, E(x_{1i}) = \mu_1, Var(x_{1i}) = \sigma_1^2 < \infty;$$

$$x_0 = (x_{01}, \ldots, x_{0n_0}) \text{ be iid}, E(x_{0i}) = \mu_0, Var(x_{0i}) = \sigma_0^2 < \infty; \quad (32)$$

assume that $x_0$ and $x_1$ are independent and that, for some $x_0$ and $x_1$, the combined sequence t $$t = (x_{11}, \ldots, x_{1n_1}, x_{01}, \ldots, x_{0n_0}) = (t_1, \ldots, t_{n=n_1+n_0}) \text{ is iid}, Var(t) = \sigma^2 < \infty; \quad (33)$$

and define $$\tilde{\beta} \equiv \mu_1 - \mu_0; \zeta_1 \equiv \frac{\sigma^2}{\sigma_0^2}, \zeta_2 \equiv \frac{\sigma^2}{\sigma_1^2}. \quad (34)$$

Under some regularity conditions, if hypothesis $H_0$: ($\tilde{\beta}=0$; $\zeta_1=\zeta_2=1$) is true and $$\hat{\tilde{\beta}} = \bar{x}_1 - \bar{x}_0, \bar{x}_i = n_i^{-1} \sum_{k=1}^{n_i} x_{ik}, i = 0, 1; \quad (35)$$

$$\tilde{V}(t) = \sum_{i=1}^{n} (t_i - \bar{t})^2 \cdot g(x_1, x_0), n = n_1 + n_0, \text{ where } \bar{t} = n^{-1} \sum_{i=1}^{n} t_i, \quad (36)$$

$$g(x_1, x_0) = \frac{(n-2)^2}{\left[\sum_{i=1}^{n_1} (x_{1i} - \bar{x}_1)^2 + \sum_{i=1}^{n_0} (x_{0i} - \bar{x}_0)^2\right]^2}; \text{ and } \tilde{\rho} = \left(\frac{1}{n_1} + \frac{1}{n_0}\right)^{-1}; \quad (37)$$

where, $\hat{\tilde{\beta}}$, is an estimate of $\tilde{\beta}$, then the random variable $$\tilde{\chi} = \tilde{\rho}(n-1)^{-1}\hat{\tilde{\beta}}^2 \tilde{V}(t) \to \chi_1^2 \quad (38)$$

converges in distribution to a chi-squared distribution with 1 degree of freedom.

By inspection of (38), one should readily recognize the behavior of our chosen function $\tilde{\beta}$, in Proposition 1, as it approximates the behavior of $\beta$. If two samples from the same population are compared using (38), the estimate of $\tilde{\beta}$, $\hat{\tilde{\beta}}$ in (35), would also tend to approach zero—as the sample size increases, and tend otherwise for samples belonging to distinct populations.

A relatively simple estimate of Var(t), as defined in (21), is derived to replace $V^*(t)$, as shown in (30). Var(t) is a sum of squared errors individually weighted by their probability of occurrence. In Proposition 1, $g(x_1, x_0)$ is proposed to provide that probability feature, but as an average probability of occurrence, instead. In this sense, comparing two samples from distinct populations would produce very high cumulative square errors using the combined vector t, but appropriately weighted by an average proportion.

In principle, the overall behavior of (38) seems to track that of (30), and both random variables are asymptotically identically distributed under $\chi_1^2$. Note that the AsemiP's performance will not asymptotically approach that of the SemiP's performance, as the number of samples increases; the former approximates the general behavior of the latter, i.e., it promotes a high separation between meaningful signals (isolated objects) from noise (homogeneous and non-homogenous local regions).

Proof: If hypothesis $H_0$: ($\tilde{\beta}=\zeta_1=\zeta_2=1$) is true in Proposition 1, then $\sigma^2=\sigma_1^2=\sigma_0^2$ and, using the independent assumptions of $x_1$ and $x_0$, and CLT, it follows that $$\frac{\hat{\tilde{\beta}}}{\sqrt{\frac{1}{n_0}+\frac{1}{n_1}}\sigma_0} = \frac{\hat{\tilde{\beta}}}{\sqrt{\frac{1}{n_0}+\frac{1}{n_1}}\sigma_1} \xrightarrow[n_1 \to \infty]{n_0 \to \infty} N(0, 1), \quad (39)$$

$\hat{\tilde{\beta}}$ as defined in Proposition 1; in addition, the following estimators of $\sigma_1^2$ and $\sigma_0^2$ are known to be consistent (see, for example, G. Casella and R. L. Berger, Statistical Inference, Belmont, CA: Duxbury Press, 1990):

$$S_1^2 = \frac{\sum_{i=1}^{n_1} (x_{1i} - \bar{x}_1)^2}{n_1 - 1}, \text{ and } S_0^2 = \frac{\sum_{i=1}^{n_0} (x_{0i} - \bar{x}_0)^2}{n_0 - 1}. \quad (40)$$

Using both samples $x_1$ and $x_0$, let the following be another estimator of $\sigma_0^2$ (or $\sigma_1^2$), given that under $H_0$ $\sigma_0^2=\sigma_1^2$, $$S^2 = \frac{(n_1-1)S_1^2 + (n_0-1)S_0^2}{(n_1-1)+(n_0-1)}. \quad (41)$$

The estimator $S^2$ is unbiased under $H_0$, as its expected value $E[S^2]$ is equal to $\sigma_0^2$ and $\sigma_1^2$:

$$E(S^2) = \frac{(n_1-1)E(S_1^2) + (n_0-1)E(S_0^2)}{(n_1-1)+(n_0-1)} \quad (42)$$
$$= \frac{(n_1-1)\sigma_1^2 + (n_0-1)\sigma_0^2}{(n_1-1)+(n_0-1)}$$
$$= \sigma_0^2.$$

This is true because $S_0^2$ and $S_1^2$ are consistent estimators and, under $H_0$, $\sigma_0^2 = \sigma_1^2$. A WLLN is now proved for $S^2$ to verify that $S^2$ is also a consistent estimator. Using Chebychev's inequality, under $H_0$:

$$P(|S^2 - \sigma_0^2| \geq \varepsilon) \leq \frac{E(S^2 - \sigma_0^2)^2}{\varepsilon^2} = \frac{\text{Var}(S^2)}{\varepsilon^2} \quad (43)$$

and, thus, a sufficient condition that $S^2$ converges in probability to $\sigma_0^2$, or $\sigma_1^2$, is that $$\text{Var}(S^2) \xrightarrow[(n_0,n_1) \to \infty]{} 0.$$

Note that $\text{Var}(S^2)$ can be expressed as $$\text{Var}(S^2) = \quad (44)$$
$$\left[\frac{(n_1-1)}{(n_1-1)+(n_0-1)}\right]^2 \text{Var}(S_1^2) + \left[\frac{(n_0-1)}{(n_1-1)+(n_0-1)}\right]^2 \text{Var}(S_0^2)$$

and, as $S_0^2$ and $S_1^2$ are both consistent estimators, their variances must converge to zero, $$\text{Var}(S_1^2) \xrightarrow[n_1 \to \infty]{} 0; \quad \text{Var}(S_0^2) \xrightarrow[n_0 \to \infty]{} 0, \quad (45)$$

also $$\left[\frac{(n_k-1)}{(n_1-1)+(n_0-1)}\right]^2 \xrightarrow[(n_1,n_0) \to \infty]{} 0; k = 0, 1. \quad (46)$$

Then $$\text{Var}(S^2) \xrightarrow[(n_1,n_0) \to \infty]{} 0$$

and, therefore, under $H_0$:

$$\frac{\sigma_0^2}{S^2} = \frac{\sigma_1^2}{S^2} \to 1, \text{ as } (n_0, n_1) \to \infty. \quad (47)$$

Using the same argument to arrive at (47), it can also be shown that under $H_0$:

$$\frac{S_t^2}{\sigma_0^2} = \frac{S_t^2}{\sigma_1^2} \to \zeta_1 = \zeta_2 = 1, \text{ as } n = (n_1 + n_0) \to \infty, \quad (48)$$

where $S_t^2$ is a consistent estimator of $\sigma^2$ under $H_0$, or $$S_t^2 = (n-1)^{-1} \sum_{i=1}^{n}(t_i - \bar{t})^2, \bar{t} = n^{-1} \sum_{i=1}^{n} t_i. \quad (49)$$

Furthermore, since $S_t^2$ is the sample variance of t (the combined vector) under $H_0$, one can readily verify that $$\frac{S_t}{\sigma_0} = \frac{S_t}{\sigma_1} \to 1, \text{ as } n = (n_1 + n_0) \to \infty \quad (50)$$

To finalize the proof, consider Theorem 2 below.

Theorem 2 (Slutsky). Let $X_n$ tend to X in distribution and $Y_n$ tend to c in probability, where c is a finite constant. Then
(i) $X_n + Y_n$ tend to X+c in distribution;
(ii) $X_n Y_n$ tend to cX in distribution;
(iii) $X_n/Y_n$ tend to X/c in distribution, if c is not zero.

(See, for example, proof in R. J. Serfling, Approximation Theorems of Mathematical Statistics, New York: Wiley, 1980, pp. 19).

Using (39), (47), (50) and the Slutsky Theorem, it is concluded that $$\left[\left(\frac{\tilde{\beta}}{\sqrt{\frac{1}{n_0} + \frac{1}{n_1}} \sigma_0}\right)\left(\frac{\sigma_0^2}{S^2}\right)\left(\frac{S_t}{\sigma_0}\right)\right] \xrightarrow[\substack{n_0 \to \infty \\ n_1 \to \infty}]{} N(0,1) \quad (51)$$

and that by squaring (51) and using convergence results from G. Casella and R. L. Berger, *Statistical Inference*, it can also be concluded that $$\tilde{\chi} = \frac{\tilde{\beta}^2}{\left(\frac{1}{n_0} + \frac{1}{n_1}\right)} \frac{S_t^2}{S^4} \xrightarrow[\substack{n_0 \to \infty \\ n_1 \to \infty}]{} \chi_1^2, \quad (52)$$

which can be readily reformatted into (38) using the definitions given in Proposition 1 and in this proof. Equation (52) concludes the proof.

The expression in (52), or alternatively in (38), is used in the AsemiP detector.

Power of the Tests

The power of the statistical test in Proposition 1 is examined. If $H_0$ is true in Proposition 1, the Type-I error probability (i.e., the probability of rejecting $H_0$, given that it is true) is $$P_{\tilde{\beta}=0}(\tilde{\chi} > \gamma) \xrightarrow[(n_0,n_1) \to \infty]{} P(\xi > \gamma) = \alpha, \quad (53)$$

where $\xi$ is a chi-square distributed random variable with 1 degree of freedom, $\tilde{\chi}$ as defined in (38) and expressed in a different form in (52), and $\gamma$ an arbitrary scalor. $P_{\tilde{\beta}=0}(\tilde{\chi}>\gamma)$ is indeed an asymptotically size a test, which is controlled by the user.

Now consider an alternative parameter value $\tilde{\beta}\neq 0$. In this case, $\sigma_0^2 \neq \sigma_1^2$ and from (52), it can be written:

$$\tilde{\chi} = \left\{\left[\underbrace{\left(\frac{\tilde{\tilde{\beta}}-\tilde{\beta}}{\sqrt{\frac{1}{n_0}\sigma_0^2 + \frac{1}{n_1}\sigma_1^2}}\right)}_{A} + \underbrace{\left(\frac{\tilde{\beta}}{\sqrt{\frac{1}{n_0}\sigma_0^2 + \frac{1}{n_1}\sigma_1^2}}\right)}_{B}\right]^2 \underbrace{\left(\frac{S_t^2}{S^4}\right)}_{C}\right\}. \quad (54)$$

Note that the term A in (54) converges in distribution to the standard Normal, $N(0,1)$, as $n_0$ and $n_1$ go to $+\infty$, no matter what the values of $\tilde{\beta}$, $\sigma_0^2$, or $\sigma_1^2$ are. Note also that the term B converges to $+\infty$ or $-\infty$ in probability, as $n_0$ and $n_1$ go to $+\infty$, depending on whether $\tilde{\beta}$ is positive or negative. $S^2$ converges in probability to zero, as does $S_t^2$, but the term C converges to $+\infty$ because $(S^2)^2 = S^4$ is in the denominator. Thus, $\tilde{\chi}$ converges to $+\infty$ in probability and $$P_{\tilde{\beta}\neq 0}(\text{reject } H_0) = P_{\tilde{\beta}\neq 0}(\tilde{\chi} > \gamma) \xrightarrow[(n_0,n_1)\to\infty]{} 1. \quad (55)$$

In this way, the test in Proposition 1 has the properties of asymptotic size $\alpha$ and asymptotic power 1, as it is desired.

Implementation of AsemiP Detector

In contrast to the SemiP algorithm, the AsemiP algorithm is significantly simpler to implement, as the latter does not require specialized subroutines (unconstrained minimization) to perform its function. Using a sampling mechanism such as described above, the variables in Proposition 1 are straightforward to implement. Preferably, statistical independence is promoted, and a sufficiently large number of samples (e.g. larger than 30) is taken to justify the use of approximation theorems of mathematical statistics. The sampling mechanism discussed above were used to obtain a pair of random feature vectors $x_{ij}$ (i=0 [reference], 1 [test]; j=1, ..., J). A 9-pixel (3×3) test window, a 56-pixel reference window, and a 60-pixel variability window, as shown in FIG. 1, were used, where J=60. For a statistical decision, high values obtained by using (38), or equivalently (52), reject the hypothesis $H_o$ in Proposition 1, thus, detecting anomalies. Set a decision threshold based on a choice of type I error using, as the base distribution, the chi-square distribution with 1 degree of freedom. Alternatively, a suitable threshold is found that yields a value at the knee of the AsemiP's corresponding ROC curve.

Application and Comparison with Other Techniques

Five other anomaly detection techniques were used for comparison purposes, and their mathematical representations are presented without proofs. The five techniques are known as: RX (Reed-Xiaoli), DPC (Dominant Principle Component), EST (eigen separation transform), FLD (Fisher's linear discriminant), and KRX (kernel RX).

The RX technique is based on the generalized likelihood ratio test (GLRT) and on the assumption that the population distribution family of both test and reference samples are multivariate normal. The FLD technique is also based on the same assumption, but differs in its subtleties in answering the question whether the test and reference samples are drawn from the same normal distribution. The FLD technique promotes separation between classes and variance reduction within each class. The PCA and EST techniques are both based on the same general principle, i.e., data are projected from their original high dimensional space onto a significantly lower dimensional space using a criterion that promotes highest sample variability within each domain in this lower dimensional space. Differences between DPC and EST are better appreciated through their mathematical representations. The KRX algorithm extends the original RX space to a nonlinear feature space by kernelizing the corresponding nonlinear GLRT expression of the conventional RX approach. The GLRT (generalized likelihood ratio test) expression of the KRX is similar to the conventional RX, but every term in the expression is in kernel form, which can be readily calculated in terms of the input data in its original data space (H. Kwon, N. Nasrabadi, "Kernel RX-Algorithm: A Nonlinear Anomaly Detector for Hyperspectral," *IEEE Trans. on Geoscience and Remote Sensing*, vol. 43, no. 2, February, 2005).

These five techniques were implemented with the conventional inside-outside window approach, choosing optimum window sizes to account for the target-size range of interest (see both scenes in FIG. 2), i.e., 5×5 inside window embraced by a 9×9 outside window, with a guard area between the two windows. These techniques are represented by the following set of equations:

$$Z_{RX} = (\bar{x}_{in} - \bar{x}_{out})^t C_{out}^{-1} (\bar{x}_{in} - \bar{x}_{out}) \quad (56)$$

$$Z_{DPC} = |E_{in}^t(\bar{x}_{in} - \bar{x}_{out})| \quad (57)$$

$$Z_{EST} = |E_{\Delta C}^t(\bar{x}_{in} - \bar{x}_{out})| \quad (58)$$

$$Z_{FLD} = |E_{S_b/S_w}^t(\bar{x}_{in} - \bar{x}_{out})| \quad (59)$$

where $\bar{x}_{in}$ is a sample mean vector from a set of inside-window vectors $x_{in}^{(i)}$, each having 150 spectral bands; $\bar{x}_{out}$ is similar but sampled from the outside window $x_{out}^{(i)}$; $C_{out}^{-1}$ is the inverse sample covariance using all vectors sampled from the outside window; $E_{in}^t$ is the highest energy eigenvector of the eigenvector decomposition of the inside-window covariance; $E_{\Delta C}^t$ is the highest positive energy eigenvector of the eigenvector decomposition of the covariance difference (inside-widow minus outside-widow); |●| denotes the absolute value; and $E_{S_b/S_w}$ is the eigenvector decomposition of the scatter matrices ratio $S_B S_W^{-1}$, where $$S_W = \sum_{i=1}^{N}(x_{in}^{(i)} - \bar{x}_{in})(x_{in}^{(i)} - \bar{x}_{in})^t + \sum_{i=1}^{M}(x_{out}^{(i)} - \bar{x}_{out})(x_{out}^{(i)} - \bar{x}_{out})^t \quad (60)$$

and $$S_B = \sum_{i=1}^{N}(x_{in}^{(i)} - \bar{x}_{total})(x_{in}^{(i)} - \bar{x}_{total})^t + \sum_{i=1}^{M}(x_{out}^{(i)} - \bar{x}_{total})(x_{out}^{(i)} - \bar{x}_{total})^t, \quad (61)$$

where $\bar{x}_{total}$ is the sample average vector using all of the samples from the inside and outside windows, and N and M are the sample size of the inside and outside windows, respectively.

For additional details on the implementation and performance of these techniques, see, for example, H. Kwon, et al., "Adaptive anomaly detection using subspace separation for hyperspectral imagery," *Opt. Eng.*, 42(11), 3342-3351, 2003.

The KRX anomaly detector can be compactly represented by the following:

$$Z_{KRX} = (K_{\bar{x}_{in}} - K_{\bar{x}_{out}})^t K_{out}^{-1}(K_{\bar{x}_{in}} - K_{\bar{x}_{out}}), \quad (62)$$

where $K_{\bar{x}_{in}} = K(\bar{x}_i, X_{out})$ is a kernel-function based vector that uses as input $\bar{x}_{in}$ and $X_{out}$, representing the dot product between these two inputs nonlinearly mapped onto a higher dimensional space, $\bar{x}_{in}$ is the sample mean vector using the columns of $X_{in}$, $\bar{x}_{out}$ is the sample mean vector using the columns of $X_{out}$, $K_{\bar{x}_{in}} = K(\bar{x}_{out}, X_{out})$ is the same kernel function using instead the dot product between $\bar{x}_{out}$ and $X_{out}$, and $K_{out}^{-1}$ is the inverse of $K_{out} = K(x_{out}, X_{out})$ using the dot product between $X_{out}$ and itself.

Finally, the kernel function used to implement the KRX detector for this research effort was the well known Gaussian (radial basis function) RBF kernel, or $$k(x_0, x_1) = \exp\left(\frac{-\|\bar{x}_0 - \bar{x}_1\|^2}{2\sigma^2}\right), \quad (63)$$

where $\|\bullet\|$ denotes the magnitude of a vector.

Top-View Imagery from the HYDICE Sensor

Experiment was carried out on data set from the hyperspectral digital imagery collection experiment (HYDICE) sensor. The HYDICE sensor records 210 spectral bands in the visible to near infrared (VNIR) and short-wave infrared (SWIR) and, for the purpose the examples described herein, it is sufficient to know that each pixel in a scene is actually a vector, consisting of 210 components. An extended description of this dataset can be found elsewhere.

The results shown for one data sub-cube are representative for other sub-cubes in the HYDICE (forest radiance) dataset. An illustrative sub-cube (shown as an average of 150 bands; 640×100 pixels) is shown in FIG. 1 (left). (We only used 150 bands by discarding water absorption and low signal to noise ratio bands; the bands used are the $23^{rd}$-$101^{st}$, $109^{th}$-$136^{th}$, and $152^{nd}$-$194^{th}$.) The scene consists of 14 stationary motor vehicles (targets near a tree-line) in the presence of natural background clutter (e.g., trees, dirt roads, grasses). Each target consists of about 7×4 pixels, and each pixel corresponds to an area of about 1.3×1.3 square meters at the given altitude. The main goals of local anomaly detection algorithms on these types of scenes are to detect objects that seem clearly anomalous to its immediate surroundings, in some predetermined feature space, and to yield in the process a tolerable number of nuisance detections. Targets are often found to be anomalous to its immediate surroundings.

Results Using HYDICE Data

ROC curves are used as a means to quantitatively compare some of these approaches.

The target set was a set of ground vehicles near a tree-line, but as anomaly detectors are not designed to detect a particular target set, the meaning of false alarms is not absolutely clear in this context. For instance, a genuine local anomaly not belonging to the target set would be incorrectly labeled as a false alarm. Nevertheless, it does add some value to our analysis to compare detections of targets versus non-targets among the different algorithms.

Figure 4A:
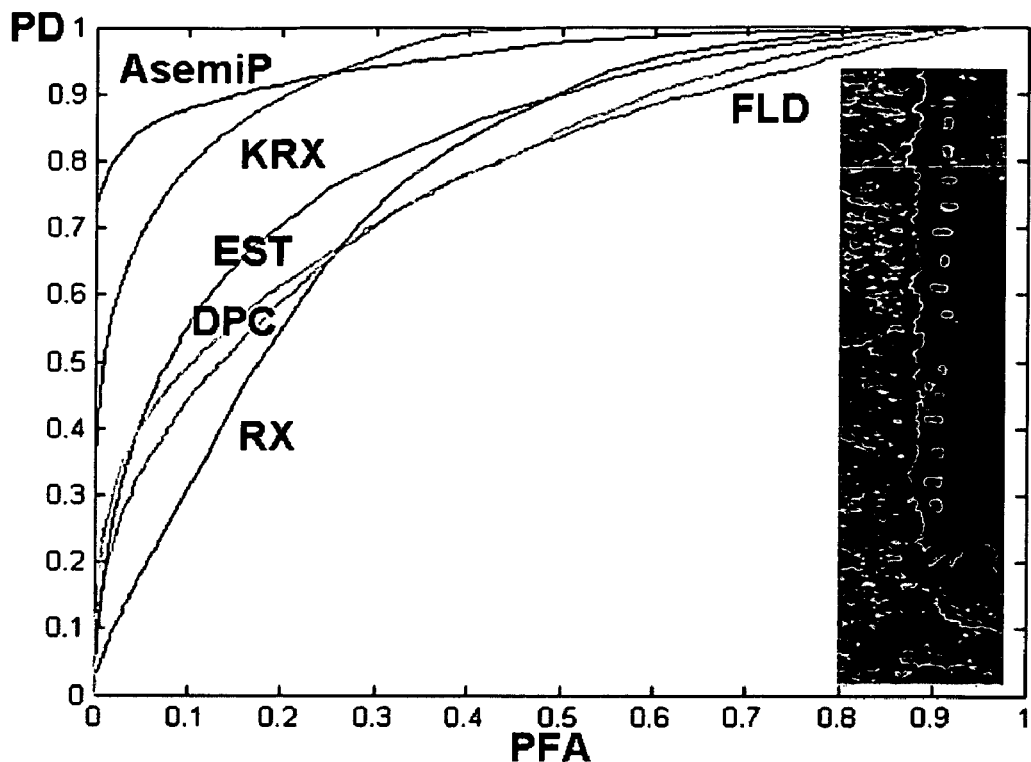
FIGS. 4A and 4B show receiver operating characteristic (ROC) curves for a comparison among an anomaly detector according to an example of the present invention (AsemiP) and five conventional detectors (FLD, DPC, RX, EST, KRX), where PD represent the probability of detecting all pixels belonging to the targets, and PFA the proportion of detecting pixels not belonging to targets (in FIG. 4B, PFA is restricted to $10^{-2}$)
Figures 5A, 5B, 5C, 5D, 5E, 5F, 5G, 5H:
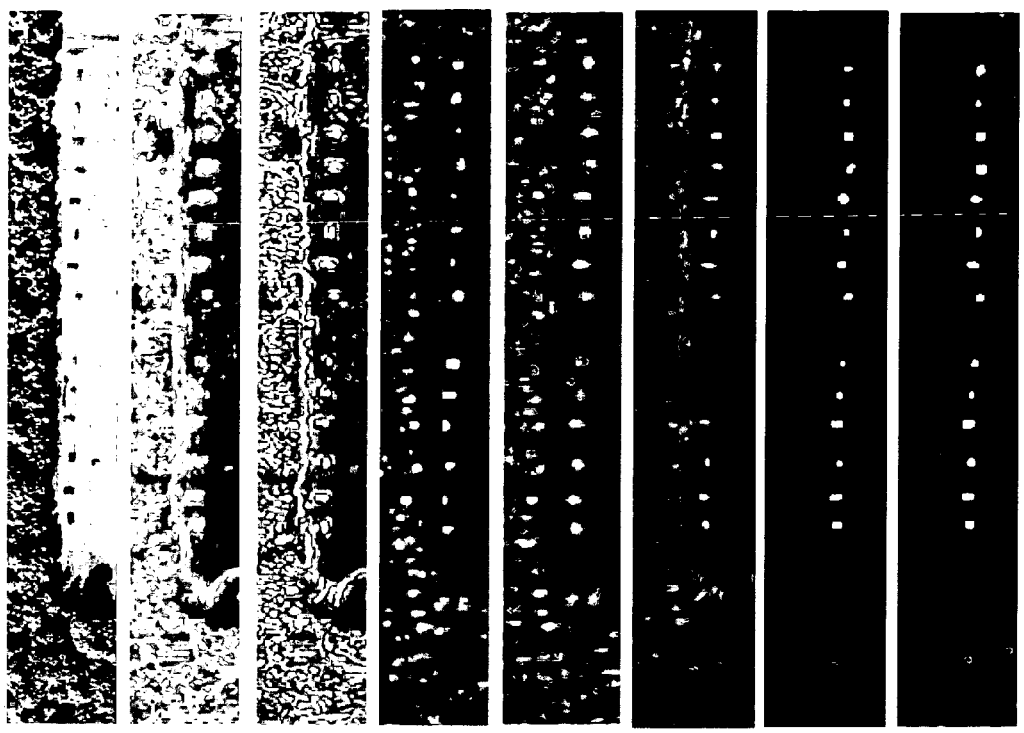
FIG. 5A shows a multicomponent scene corresponding to that discussed in relationship to FIG. 2.
FIGS. 5B-5H show 2-dimensional decision surfaces for the data scene of FIG. 5A, where the intensity of local peaks reflects the anomaly strength as seen by different anomaly detectors (SemiP is another example of the present invention)

FIG. 4A shows ROC curves produced by the output of the six algorithms on the HYDICE data scene shown in FIG. 5A, and schematically represented and discussed in relation to FIG. 2. The SemiP and AsemiP detectors are noticeably less sensitive to different decision thresholds; their performances almost achieve an ideal ROC curve for that scene, i.e., a step function starting at point (PFA=0,PD=1).

Figure 4B:
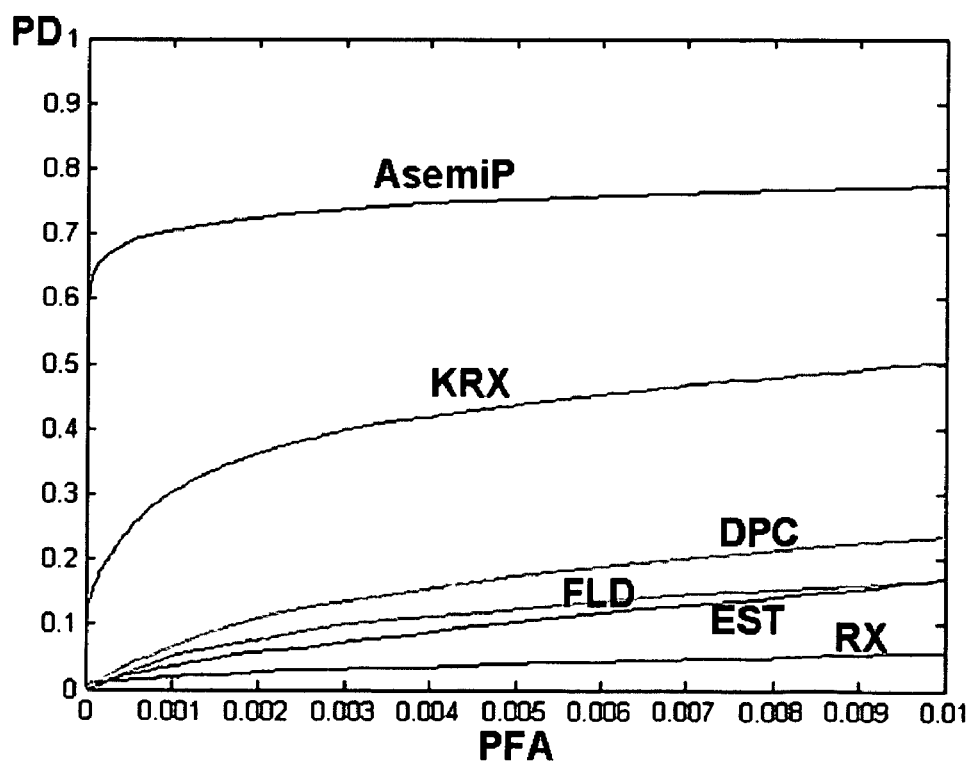

FIG. 4B shows the same ROC curves shown in FIG. 4A, but having a PFA restricted to $10^{-2}$.

Detection performance was measured using the ground truth information for the HYDICE imagery. The coordinates of all the rectangular target regions and their shadows were used to represent the ground truth target set, call it TargetTruth. If the region outside the TargetTruth is denoted as ClutterTruth, then the intersection between TargetTruth and ClutterTruth is zero and the entire scene is the union of TargetTruth and ClutterTruth. For a given decision threshold, the proportion of target detection (PD) is measured as the proportion between the number of detected pixels belonging to TargetTruth over all pixels belonging to TargetTruth. On the other hand, the proportion of false alarms (PFA) is measured as the proportion between the number of detected pixels belonging to ClutterTruth over all pixels belonging to ClutterTruth.

In general, the quality of a detector can be readily assessed by noticing a key feature in the shape of its ROC curve: the closer the knee of a ROC curve is to the PD axis, the less sensitive the approach is to different decision thresholds. In other words, PFA does not change significantly as PD increases. (An ideal ROC curve resembles a step function that starts at point [PFA=0,PD=1].) As it can be readily assessed from FIGS. 4A and 4B, the SemiP and AsemiP detectors clearly outperform the other four techniques on the tested scene. That difference in performance can be better appreciated in FIG. 4B, where PFA is further restricted to a maximum value of 0.02 compared to 0.4 in FIG. 4A. Beyond the value of PFA=0.4, these ROC curves reach PD near 1.0.

FIG. 5A shows the average band (150 spectral bands) of the scene containing the 14 targets in Aberdeen Maryland. FIGS. 5B-5H show the decision surfaces of the corresponding anomaly detectors. The intensity of local peaks reflects the strength of evidences as seen by different anomaly detectors. Boundary issues were ignored in this test; surfaces were magnified to about the size of the original image only for the purpose of visual comparison. The significant display of performance shown in FIG. 5 by the proposed algorithms is further appreciated by taking a closer look at the output surfaces produced by all seven detectors, as they show evidences of local candidate anomalies in the scene. The intensity of local peaks shown in FIG. 5 reflects the strength of the evidence. It is evident that the surfaces produced by RX, PCA, EST, FLD, and KRX detectors are expected to be significantly more sensitive to changing decision thresholds then the ones produced by the SemiP and AsemiP detectors.

Although the 2-dim (2-dimensional) version of the output surfaces shown in FIG. 5 displays useful differences among the responses of the six detectors, they do not make full justice to the quality of the SemiP and AsemiP detectors.

Figure 6A:
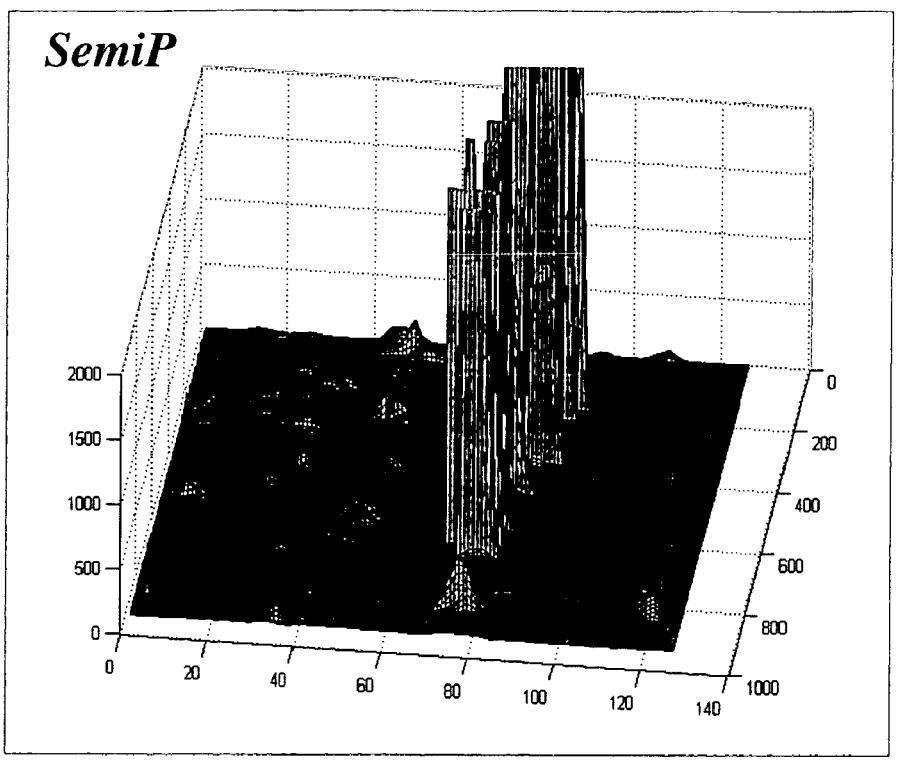
FIG. 6 shows 3-dimensional decision surfaces produced by the SemiP and AsemiP detectors, where the dominant peaks represent the presence of targets (fourteen targets parked near the tree-line shown in FIG. 5A)
Figure 6B:
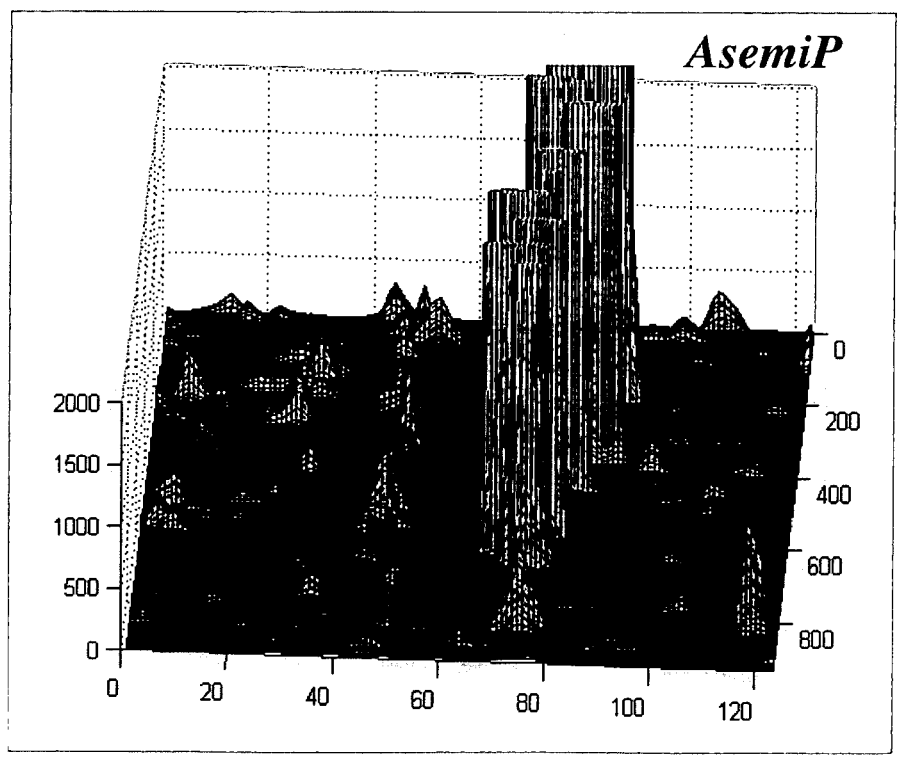

FIG. 6 shows 3-dimensional (3D) decision surfaces produced by the SemiP and AsemiP detectors, where the dominant peaks represent the presence of the fourteen targets parked near the tree-line. Less-dominant peaks represent areas in the scene most prone to cause nuisance detections (e.g., region discontinuity). The SemiP and AsemiP detectors show a remarkable ability to acentuate genuine local anomalies from their surroundings.

Both surfaces in FIG. 6 were clipped at the value of 2,000 but some of their values do continue to significantly higher numbers. The dominant (clipped) peaks are the results produced by the fourteen targets near the tree-line.

Areas containing the presence of clutter mixtures (e.g., edge of terrain, edge of tree clusters), where other methods usually yield a high number of false alarms (false anomalies), are suppressed by the new approaches. The reason for this suppression is that, as part of the overall comparison strategy, the reference and test feature vectors are not compared as two individual samples; instead, a new sample is constructed, combined data being the union of data from both the test window and the reference window, and compared to the test sample. This indirect comparison approach, which is inherent in both detectors, can ensure that a component of a mixture (e.g., shadow) shall not be detected as a local anomaly when it is tested against the mixture itself (e.g., trees and shadows). Performances of such cases are represented in FIG. 6 in the form of softer anomalies (significantly less-dominant peaks).

Both detectors perform remarkably well accentuating the presence of dominant local anomalies (e.g., targets and their shadows) from softer anomalies (e.g., region discontinuity). This ability explains the SemiP's and AsemiP's superior ROC-curve performances shown in FIGS. 4A and 4B.

Figure 7A:
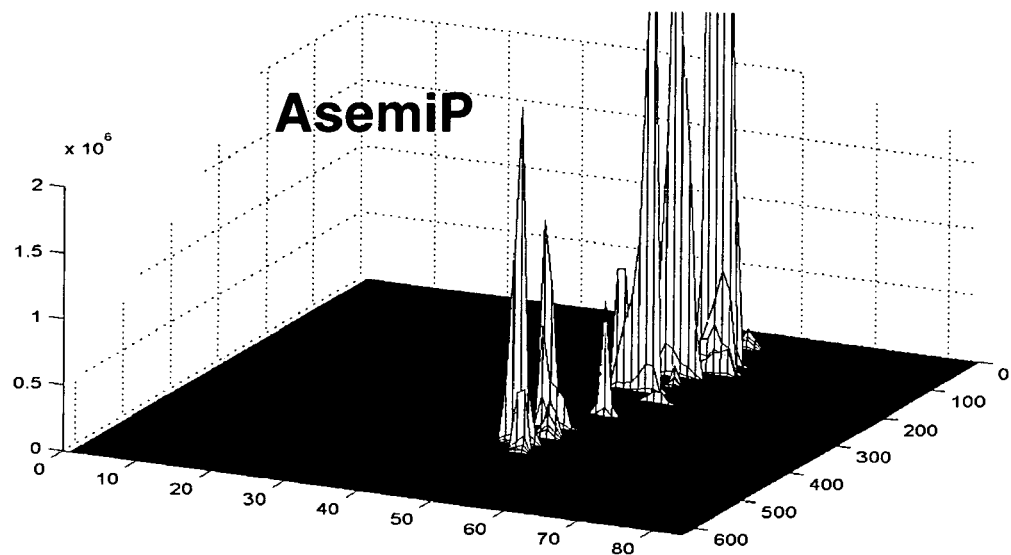
FIG. 7A shows 3-dimensional decision surface produced by the AsemiP detector for the hyperspectral (HS) scene shown in FIG. 5A.
Figure 7B:
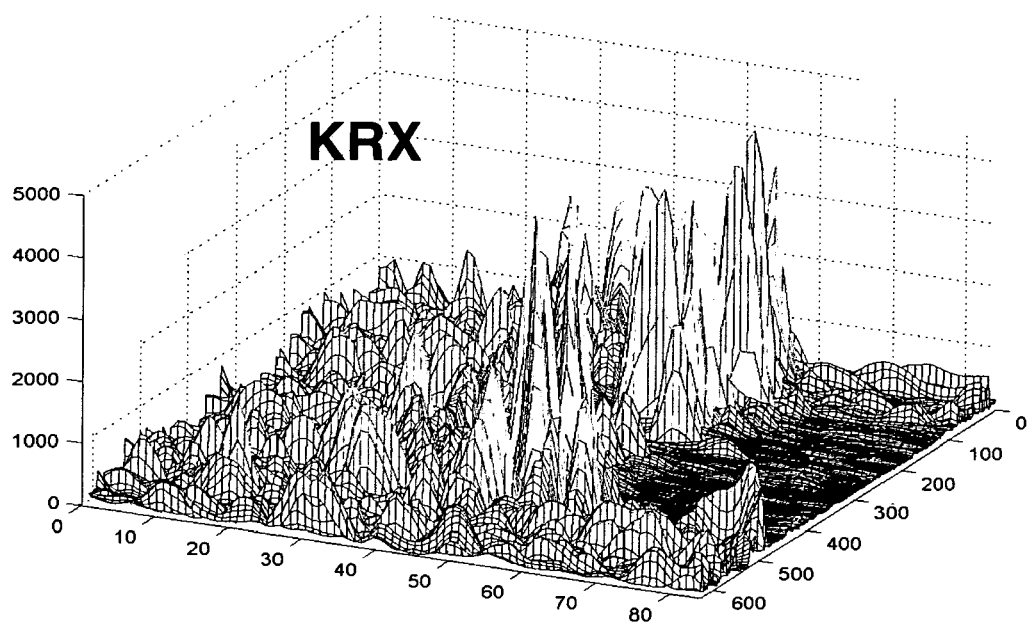
FIG. 7B shows 3-dimensional decision surface produced by the KRX detector (a conventional technique) for the HS scene shown in FIG. 5A.

FIGS. 7A-7B show the 3D decision surfaces of the indirect comparison based AsemiP detector and the conventional KRX detector from a test using the hyperspectral scene shown in FIG. 5A. The high peaks represent the presence of some or all of the 14 targets in both surfaces.

Ground View Imagery from the SOC-700 Sensor

The ground-view imagery used for this work was collected with a visible to near-IR spectral imager (SOC-700) from Surface Optics Corporation, San Diego, Calif. The system is a relatively small, portable hyperspectral imager, which collects a hyperspectral cube consisting of 640×640 pixels×120 spectral bands and has a spectral range covering 0.38 to 0.92 microns. The sensor is commercially available.

Figure 8:
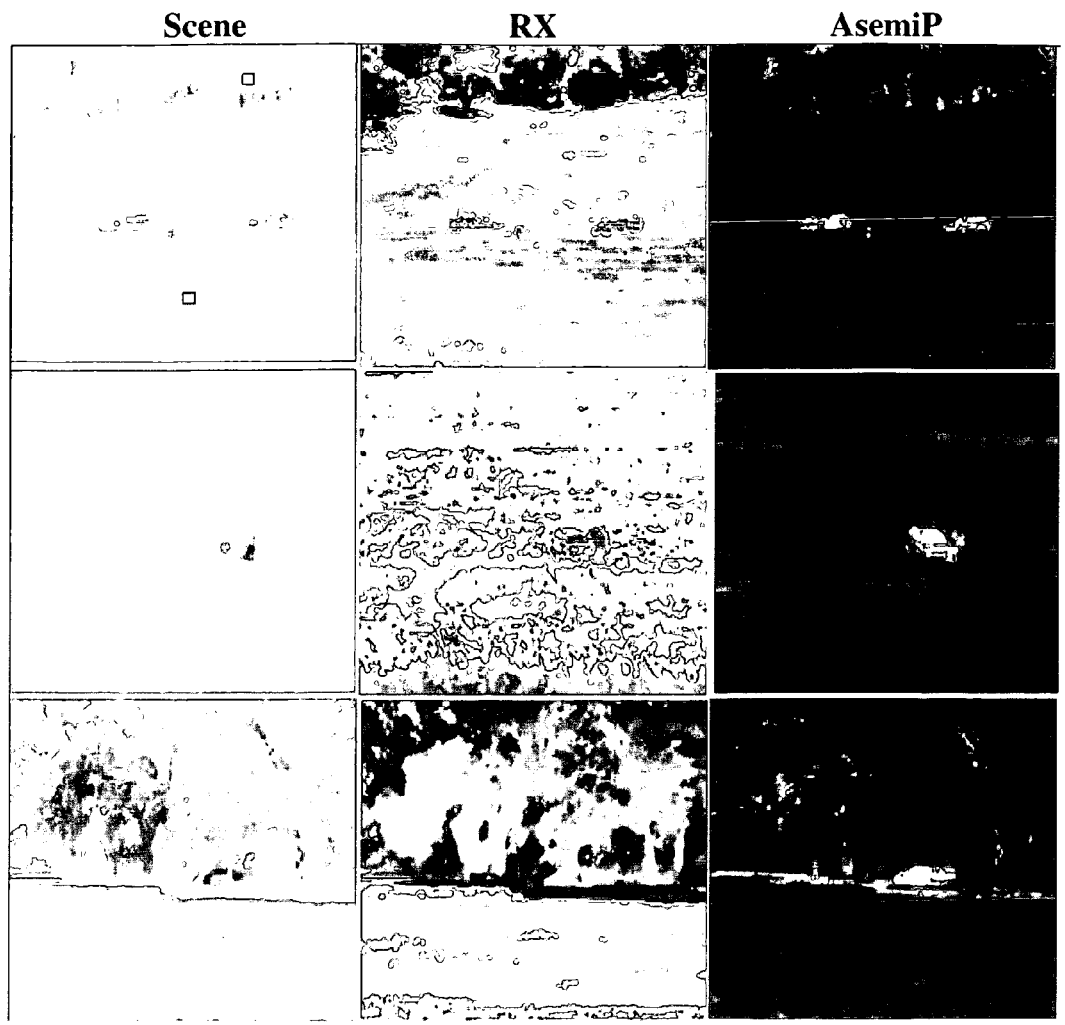
FIG. 8 shows scene anomaly detection applying the AsemiP detector and the RX detector (a well-known standard technique) from a ground level perspective using reference spectra obtained from two reference sets, corresponding to California tree leaves and valley terrain.

FIG. 8 illustrates scene anomaly detection using two reference sets of spectral samples from California tree leaves and valley terrain. The first (left hand) column shows three scenes used for this study, as the average of 120 bands. Scene 1 was arbitrarily selected to draw two sets of reference spectral samples.

Scene 1 contains three motor vehicles and a standing person in the center of that scene (i.e., two pick-up trucks to the left in proximity to each other, a man slightly forward from the vehicles in the center, and a sport utility to the right). The background in Scene 1 is dominated by the following two most abundant object classes: Californian valley-type trees and terrain. Scene 2 consists of the same sport utility vehicle and the same person standing in proximity to it, they are located in the same valley, but at a different area from the one in Scene 1. Scene 3 (row 3, column 1) depicts a significantly more complicated scenario, where the same man and the same sport utility vehicle can be found in the shadows of a large cluster of trees. Portions of the shadowed vehicle are observable near the center in Scene 3, and the shadowed man is reportedly halfway between the vehicle and the left side of the image. The three scenes were independently displayed using the same colormap (false color transformation), which means that the pixel intensities shown in each individual surface is only relative to the corresponding surface. (Pixel values representing the same object class may be displayed with different intensities in another surface, depending on other objects in the scene.) This fact explains the brightness difference between the terrains displayed in Scene 2 and Scene 3, given that the meteorological conditions and terrains were about the same for all three scenes. The strong reflections from certain parts of the vehicles captured by the sensor in Scene 1 and 2 are not as dominant in Scene 3 because the vehicle there is in the shadow; hence, the terrain in Scene 3 appears to be a strong reflector.

Two approaches can be used: (1) seeking global anomalies in a natural clutter background, given that only a few spectral samples from the most abundant object classes in the background (in this case, trees and terrain) are drawn from the same HS data and presented, as references, to the detectors, and (2) seeking global anomalies, given that the reference samples are not drawn from the same HS data.

The RX and the AsemiP detectors were applied to the scenes in the first column of FIG. 8, and output surfaces are presented in the second and third columns, respectively. In this example, the outside window is represented instead by a fixed reference set, such that samples from the test window [a 3×3 window (nine 120-band spectral samples)] are used in conjunction with the two reference sample sets (one representing responses from tree leaves and another from a patch of terrain), each consisting of 100 spectral samples, for a total of 200 reference samples, a mere 0.05% of the image area. The two small boxes shown in Scene 1 represent the general locations—chosen arbitrarily—where the two reference sets were drawn from. The same data preprocessing (i.e., high pass filtering and angle difference) was applied to the spectral samples. The AsemiP detector suppressed the meaningless detections (edges) and accentuated meaningful detections.

The AsemiP detector was expected to compare systematically across the imagery the preprocessed test samples with the fixed preprocessed samples from both reference sets. If a local set of preprocessed test samples is significantly different from both fixed reference sets, the AsemiP detector should produce an accentuated value at that location indicating this fact; otherwise, it should produce a suppressed value. To achieve this expectation using two reference classes, one could simply collect the individual comparison result from each reference class and then keep only the minimum result between the two, as a final decision for that given 3×3 test location.

The RX detector was adapted to the ground-view problem using the recommended data preprocessing discussed in X. Yu et al., "Automatic target detection and recognition in multiband imagery: A unified ML detection and estimation approach," *IEEE Tran. Image Processing*, vol. 6, pp. 143-156, January 1997, i.e., a spatial high pass filter was applied to the untransformed hyperspectral samples belonging to the same reference sets used for the AsemiP detector, also to the samples from the test samples across the imagery. This procedure removes the spatially nonstationary mean, which is not useful for the RX detector, and promotes spatial independence, allowing this detector to exploit an expected correlation in the spectral domain among samples belonging to the same class. Under the assumptions given in the RX model, this detector is expected to produce an accentuated value when the simplified Mahalanobis distance between a high-pass filtered reference set and a test set is significantly high; otherwise, it is expected to produce a suppressed value. Since there are, in this implementation, two fixed reference sets, the minimum between the two distances was also used as a means to produce a final result per location in the imagery. Recall that by using this decision logic, an anomalous test sample to both reference sets would still produce a high value, since both results would likely yield high values.

The output surfaces of the RX and AsemiP detectors are shown in columns 2 and 3, respectively, for the corresponding scenes in column 1. A shade map emphasize anomalies with respect to the reference samples by their intensity levels, i.e., white is equivalent to the strongest anomalies, light gray to strong anomalies, gray to intermediate anomalies, dark gray to weak anomalies, and black to weakest anomalies. The false shades change gradually and are relative only to those results within the same surface, for instance, a shade in one surface does not mean necessarily that its value is equivalent to a similar shade in another surface.

The local results shown in the first RX surface show that a detector based on conventional methods performs well suppressing objects in the scene having low variability and belonging to the same class of a reference set (Case 3)—the trees were suppressed. Likewise, it performs well accentuating objects that are significantly different from the reference set (Case 1)—some parts of the target, vehicle at the right, were highly accentuated (zooming close enough, one can observe a few white pixels within the boundaries of the vehicles shown in both RX surfaces in column 2, rows 2 and 3.). Unfortunately, as it was observed in the top-view problem, local areas characterized by class mixtures (transition of regions) might be accentuated by these detectors, (see RX performance in FIG. 8 (row 1, column 2), obscuring the presence of meaningful objects in that scene. In fact, for the scenes presented in FIG. 8, the RX detector seems to perform more as an edge detector than an anomalous object detector.

The AsemiP detector, on the other hand, was able to suppress virtually all the background of Scene 1, and to accentuate large portions of the vehicles and of the standing man. For the bottom image, the pants of a standing man, in shadow, were accentuated as an anomaly with respect to the reference sample sets of tree and terrain. In the upper left-hand side image, the same man is standing next to the vehicle. In a qualitative sense, test samples consisting of, say, a mixture of shadow and terrain were likely suppressed due to the indirect comparison between the mixture itself and the union between that mixture and a component of that mixture, in this case, terrain.

The suppression of shadows may be explained by the following: Regions characterized by tree shadows, for instance, may be interpreted as partially obscured terrain because tree leaves do partially obscure the incident solar light; however, since significant spectral radiances are still reflected from the partially shadowed terrain, such a region will be suppressed when compared to the union of itself and the reference set of open terrain. The RX surface shown in rows 2, column 2, suggests that the RX detector may be susceptible to subtle spectral differences of the same terrain when observed by the same HS sensor in a different area. Recall that Scenes 2 and 3 were tested using the same reference sets drawn from Scene 1. The surface shown in row 2, column 3, suggests that the AsemiP detector is significantly more robust to spectral differences of the same terrain.

The interpretation of a shadowed object as a partially obscured object is especially relevant in Scene 3. The output surface shown in FIG. 8, row 3, column 2, emphasizes the fact that the RX anomaly detector performs as expected: it detects anomalies in the scene. Unfortunately, these anomalies are not necessarily always meaningful to an image analyst. For Scene 3, some of the tracks made by the shadowed vehicle, and the transition between the shadowed and the non-shadowed terrain were the most anomalous regions in the scene, as seen by the RX detector. Fortunately, with the indirect comparison approach that is inherent in the AsemiP detector, these same regions were virtually suppressed, while the more meaningful anomalous structures (vehicle and human pants) were accentuated, see surface in row 3, column 3.

In this example, the test feature set is generated from the test data (which for the Ground-View Imagery is a single spectral sample from a 1x1 test window or an average sample from an NxN test window) and the different spectra of a reference set. The reference feature set is generated from an average spectrum of the reference data and the individual reference spectra. All the spectral samples, whether individual or averages, are high-pass filtered (HPF) first in the spectral domain before the test and reference feature sets are generated. HPF will remove statistical dependence (which includes correlation) in the spectral domain.

Furthermore, more than one reference set can be used, and the results using each reference set can be combined to improve anomaly detection. For a given test location in the imagery, each reference set can be processed individually yielding a detection result. For example, for two reference classes R1 and R2, the detector produces two outputs O1 and O2 (both are scalors, not vectors). For a final decision at a test location (x,y), the final result is found from O1 and O2 as follows: Final_Result(x,y)=Minimum (O1, O2).

If the test sample at (x,y), or T(x,y), is significantly different from both R1 and R2, both O1 and O2 are expected to be very high numbers, hence, the minimum between O1 and O2 [Final_Result(x,y)] is also expected to be a very high number, ensuring the fact that T(x,y) is anomalous to R1 and R2. If T(x,y) is not significantly different from R1 or R2, one of the outputs O1 or O2 is expected to be very low, hence, Final_Result(x,y) will be that same very low value, ensuring the fact that T(x,y) is very similar to R1, R2, or to both.

This decision logic is valid and easily generalized for cases involving more than two classes (R1, R2, R3, . . . RN). A collection of Final_Result(x,y) across the imagery yields the output surfaces shown in FIG. 8 for both the RX and AsemiP anomaly detectors, running independently of course.

The computational time is reduced by obtaining reference samples from the most abundant objects in a target region, e.g., terrain (such as rock, sand, soil, snow, ice, water, and the like), flora (such as grass, trees, other foliage), man-made materials not of any particular interest (such as buildings, cement, asphalt, and the like), or other feature expected in the scene but not of particular interest) are collected, preprocessed, and stored a priori in an anomaly detection device, or database in communication with it. The device can then wait for online hyperspectral imagery for testing. Notice that in this example, in contrast with the sampling mechanism shown in FIG. 2, the variability spectra are the actual samples representing the most abundant objects, which may be obtained within the scene, or some or all of the plurality of variability spectra being stored in advance in a database. The spectral average obtained using reference window 24 in FIG. 2 is represented in this example by the spectral average of the variability spectra.

Examples of the present invention can be used for target detection in other ranges of the electromagnetic spectrum, such as radar imaging. For example, target detection using SAR (synthetic aperture radar) images can be achieved. In a SAR pixel, data is represented by a single value, and one can also use the concept of 3 window cells: Variability, Reference, and Test. Let $(y_1, y_2, \ldots, y_n)$ be the pixel values inside the Variability window, $y_{00}$ be the average of all pixel values inside the Reference window, and $y_{11}$ be the average of all pixels inside the Test window, or the single pixel in the Test window (in the case it has only one pixel). Two feature sets can be generated by computing the differences, for example: Reference Feature, $xR=(y_1-y_{00}, y_2-y_{00}, \ldots, y_n-y_{00})$, and Test Feature, $xT=(y_1-y_{11}, y_2-y_{11}, \ldots, y_n-y_{11})$. Further, xR and xT can be combined (formation of the union of the two samples), using C=(xR, xT), and a comparison made of C with xR, or C with xT, for example, using one of the novel algorithms described herein. This approach may also be adapted to other image analysis applications, and other applications where anomalous data are sought. Feature sets can be generated from first and second data examples using a plurality of data examples, and a combination of the feature sets compared with either one of the feature sets.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A method of detecting an image anomaly within a scene represented by image data, the method comprising:
   defining a test window within the scene;
   using a hyperspectral sensor to obtain test data relating to the test window;
   obtaining reference data;
   wherein the test data are derived from a test spectrum obtained from the test window, and the reference data are derived from a reference spectrum;
   generating combined data by combining the test data and the reference data;
   detecting the image anomaly by comparing the combined data with the test data or the reference data;
   obtaining variability spectra, the variability spectra being used to enhance the statistical independence of the test data and the reference data;
   wherein the test data comprise a test feature set derived from the test spectrum and the variability spectra;
   the reference data comprise a reference feature set derived from the reference spectrum and the variability spectra; and
   the combined data comprise a combined feature set, the combined feature set being a combination of the test feature set and the reference feature set;
   wherein the test feature set is generated by:
   applying a high-pass filter to the test spectrum to obtain a filtered test spectrum;
   applying a high pass filter to each of the variability spectra to obtain filtered variability spectra; and
   generating each component of the test feature set using the filtered test spectrum and one of the filtered variability spectra, the test feature set having a number of components equal to the number of variability spectra.

2. A method of detecting an image anomaly within a scene represented by image data, the method comprising:
   defining a test window within the scene;
   using a hyperspectral sensor to obtain test data relating to the test window;
   obtaining reference data;
   wherein the test data are derived from a test spectrum obtained from the test window, and the reference data are derived from a reference spectrum;
   generating combined data by combining the test data and the reference data;
   detecting the image anomaly by comparing the combined data with the test data or the reference data;
   obtaining variability spectra, the variability spectra being used to enhance the statistical independence of the test data and the reference data;
   wherein the test data comprise a test feature set derived from the test spectrum and the variability spectra;
   the reference data comprise a reference feature set derived from the reference spectrum and the variability spectra; and
   the combined data comprise a combined feature set, the combined feature set being a combination of the test feature set and the reference feature set;
   wherein the reference feature set is generated by:
   applying a high-pass filter to the reference spectrum to obtain a filtered reference spectrum;
   applying a high pass filter to each of the variability spectra to obtain filtered variability spectra;
   generating each component of the reference feature set using the filtered reference spectrum and one of the filtered variability spectra, the reference feature set having a number of components equal to the number of variability spectra.

* * * * *